United States Patent
Mascaro et al.

(10) Patent No.: US 11,069,001 B1
(45) Date of Patent: Jul. 20, 2021

(54) METHOD AND SYSTEM FOR PROVIDING PERSONALIZED USER EXPERIENCES IN COMPLIANCE WITH SERVICE PROVIDER BUSINESS RULES

(71) Applicant: Intuit Inc., Mountain View, CA (US)

(72) Inventors: Massimo Mascaro, San Diego, CA (US); Joseph Cessna, San Diego, CA (US); Peter Ouyang, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1087 days.

(21) Appl. No.: 14/996,415

(22) Filed: Jan. 15, 2016

(51) Int. Cl.
*G06Q 40/00* (2012.01)
*G06F 3/0482* (2013.01)

(52) U.S. Cl.
CPC ......... *G06Q 40/123* (2013.12); *G06F 3/0482* (2013.01)

(58) Field of Classification Search
None
See application file for complete search history.

(56) References Cited

U.S. PATENT DOCUMENTS

| | | | |
|---|---|---|---|
| 4,763,277 A | 8/1988 | Ashford et al. | |
| 6,327,574 B1 | 12/2001 | Kramer et al. | |
| 6,922,488 B2 | 7/2005 | Mastrianni et al. | |
| 6,973,418 B1 | 12/2005 | Kirshenbaum | |
| 7,716,094 B1 | 5/2010 | Sutter et al. | |
| 7,769,647 B1 | 8/2010 | Char et al. | |
| 7,788,137 B1 | 8/2010 | Tifford | |
| 7,788,204 B1 | 8/2010 | Thomas | |
| 7,797,166 B1 | 9/2010 | Bradley et al. | |
| 7,860,763 B1 | 12/2010 | Quinn et al. | |

(Continued)

FOREIGN PATENT DOCUMENTS

| | | |
|---|---|---|
| WO | 2006058207 A2 | 6/2006 |
| WO | WO 2016/039779 | 3/2016 |

OTHER PUBLICATIONS

Hoeting et al., "Bayesian Model Averaging," Technical Report 335, Department of Statistics, University of Washington, May 28, 1998, 40 pages.

(Continued)

*Primary Examiner* — Mike Anderson
*Assistant Examiner* — Matthew Cobb
(74) *Attorney, Agent, or Firm* — Paradice and Li LLP

(57) ABSTRACT

A method and system adaptively improves potential customer conversion rates, revenue metrics, and/or other target metrics by providing effective user experience options to some users while concurrently testing user responses to other user experience options, according to one embodiment. The method and system selects the user experience options by applying user characteristics data to an analytics model, according to one embodiment. The method and system analyzes user responses to the user experience options to update the analytics model, and to dynamically adapt the personalization of the user experience options, according to one embodiment. The method and system filters out user experience options from delivery to users, if the user experience options are non-compliant with one or more business rules, to maintain business relations for the service provider and to maintain user confidence in the services provided by the service provider (e.g., a tax return preparation system), according to one embodiment.

16 Claims, 14 Drawing Sheets

(56) References Cited

U.S. PATENT DOCUMENTS

| | | |
|---|---|---|
| 7,917,411 B1 | 3/2011 | Bedell |
| 8,024,660 B1 | 9/2011 | Quinn et al. |
| 8,090,794 B1 | 1/2012 | Kilat et al. |
| 8,099,309 B1 | 1/2012 | Bober |
| 8,190,499 B1 | 5/2012 | McVickar |
| 8,200,527 B1 | 6/2012 | Thompson et al. |
| 8,346,635 B1 | 1/2013 | Olim |
| 8,407,113 B1 | 3/2013 | Eftekhari et al. |
| 8,452,676 B1 | 5/2013 | Talan et al. |
| 8,490,018 B2 | 7/2013 | Carter et al. |
| 8,706,762 B1 | 4/2014 | Patzer et al. |
| 8,768,313 B2 | 7/2014 | Rodriguez |
| 8,775,070 B1 | 7/2014 | Bhatia |
| 8,806,444 B1 | 8/2014 | Podgorny et al. |
| 8,909,568 B1 | 12/2014 | Mann et al. |
| 9,128,911 B1 | 9/2015 | Howe et al. |
| 9,355,650 B2 | 5/2016 | Dimitriadis et al. |
| 9,378,065 B2 | 6/2016 | Shear et al. |
| 9,442,827 B2 | 9/2016 | Mascaro et al. |
| 9,444,824 B1 | 9/2016 | Balazs et al. |
| 9,484,044 B1 | 11/2016 | Mascaro et al. |
| 9,530,434 B1 | 12/2016 | Mascaro et al. |
| 9,648,171 B1 | 5/2017 | Eftekhari et al. |
| 9,870,785 B2 | 1/2018 | Bradley et al. |
| 9,891,792 B1 | 2/2018 | Morin et al. |
| 9,922,668 B2 | 3/2018 | Bradley et al. |
| 9,983,859 B2 | 5/2018 | Mascaro et al. |
| 9,990,544 B1 | 6/2018 | Uribe et al. |
| 10,013,721 B1 | 7/2018 | Laaser et al. |
| 10,096,072 B1 | 10/2018 | Ali et al. |
| 10,162,734 B1 | 12/2018 | Podgorny et al. |
| 10,169,828 B1 | 1/2019 | Morin et al. |
| 10,176,534 B1 | 1/2019 | Mascaro et al. |
| 10,204,382 B2 | 2/2019 | Morin et al. |
| 10,373,064 B2* | 8/2019 | Mascaro ............... G06N 5/003 |
| 10,621,677 B2* | 4/2020 | Mascaro ............. G06Q 40/123 |
| 2002/0152457 A1 | 10/2002 | Jahnke |
| 2003/0028451 A1 | 2/2003 | Ananian |
| 2003/0144868 A1 | 7/2003 | MacIntyre et al. |
| 2006/0112114 A1 | 5/2006 | Yu et al. |
| 2006/0143093 A1 | 6/2006 | Brandt et al. |
| 2006/0155632 A1 | 7/2006 | Cherkas et al. |
| 2006/0294084 A1 | 12/2006 | Patel et al. |
| 2007/0100679 A1 | 5/2007 | Wollan et al. |
| 2007/0192166 A1 | 8/2007 | Van Luchene |
| 2007/0239518 A1 | 10/2007 | Chung et al. |
| 2007/0260596 A1 | 11/2007 | Koran et al. |
| 2008/0071703 A1 | 3/2008 | Evans |
| 2008/0077462 A1 | 3/2008 | Patel et al. |
| 2008/0127127 A1 | 5/2008 | Chitgupakar et al. |
| 2008/0147494 A1 | 6/2008 | Larson |
| 2009/0089141 A1 | 4/2009 | Lara et al. |
| 2009/0106178 A1 | 4/2009 | Chu |
| 2009/0132368 A1* | 5/2009 | Cotter .................... G06Q 30/02 |
| | | 705/14.55 |
| 2009/0313086 A1 | 12/2009 | Lee et al. |
| 2011/0071975 A1 | 3/2011 | Friedlander et al. |
| 2011/0243553 A1 | 10/2011 | Russell |
| 2011/0264569 A1 | 10/2011 | Houseworth et al. |
| 2011/0288868 A1 | 11/2011 | Lloyd et al. |
| 2011/0296401 A1 | 12/2011 | Depoy |
| 2012/0027246 A1 | 2/2012 | Tifford et al. |
| 2012/0030079 A1 | 2/2012 | Slater et al. |
| 2012/0030080 A1 | 2/2012 | Slater et al. |
| 2012/0109792 A1* | 5/2012 | Eftekhari ............... G06Q 40/02 |
| | | 705/31 |
| 2012/0150888 A1 | 6/2012 | Hyatt et al. |
| 2012/0215669 A1 | 8/2012 | Lieberman et al. |
| 2012/0303559 A1 | 11/2012 | Dolan |
| 2013/0080911 A1 | 3/2013 | Klemm |
| 2013/0088650 A1 | 4/2013 | Rouady et al. |
| 2013/0198047 A1 | 8/2013 | Houseworth et al. |
| 2013/0268468 A1* | 10/2013 | Vijayaraghavan ..... G06Q 30/02 |
| | | 706/12 |
| 2013/0282539 A1 | 10/2013 | Murray |
| 2014/0067518 A1 | 3/2014 | McGovern |
| 2014/0068407 A1* | 3/2014 | Suh ........................ G06Q 30/02 |
| | | 715/234 |
| 2014/0068600 A1 | 3/2014 | Ashok et al. |
| 2014/0075336 A1 | 3/2014 | Curtis et al. |
| 2014/0122381 A1 | 5/2014 | Nowozin |
| 2014/0156681 A1 | 6/2014 | Lee et al. |
| 2014/0201045 A1 | 7/2014 | Pai et al. |
| 2014/0359261 A1 | 12/2014 | Collins et al. |
| 2015/0039297 A1 | 2/2015 | Greer et al. |
| 2015/0112826 A1 | 4/2015 | Crutchfield, Jr. |
| 2015/0205842 A1 | 7/2015 | Jain et al. |
| 2015/0220604 A1 | 8/2015 | Bunnell |
| 2015/0227962 A1 | 8/2015 | Wical et al. |
| 2015/0254675 A1 | 9/2015 | Kannan et al. |
| 2016/0012350 A1 | 1/2016 | Narayanan et al. |
| 2016/0029055 A1 | 1/2016 | Villegas et al. |
| 2016/0063645 A1 | 3/2016 | Houseworth et al. |
| 2016/0078471 A1 | 3/2016 | Hamedi |
| 2016/0078567 A1* | 3/2016 | Goldman ............. G06Q 40/123 |
| | | 705/31 |
| 2016/0098804 A1 | 4/2016 | Mascaro et al. |
| 2016/0103667 A1 | 4/2016 | Chen et al. |
| 2016/0148321 A1 | 5/2016 | Ciaramitaro et al. |
| 2016/0180470 A1 | 6/2016 | Mascaro et al. |
| 2016/0180484 A1 | 6/2016 | Roebuck |
| 2016/0217534 A1 | 7/2016 | Goldman et al. |
| 2016/0247239 A1* | 8/2016 | Houseworth ........ G06Q 40/123 |
| 2016/0267397 A1 | 9/2016 | Carlsson |
| 2016/0335674 A1 | 11/2016 | Plourde |
| 2016/0342911 A1 | 11/2016 | Kannan et al. |
| 2016/0350870 A1 | 12/2016 | Morin et al. |
| 2017/0004422 A1 | 1/2017 | Todd et al. |
| 2017/0090893 A1 | 3/2017 | Aditya et al. |
| 2017/0103439 A1* | 4/2017 | Kolb ....................... G06F 16/93 |
| 2017/0178199 A1 | 6/2017 | Cessna et al. |
| 2017/0186097 A1 | 6/2017 | Mascaro et al. |
| 2017/0193546 A1 | 7/2017 | Bennett et al. |
| 2017/0195488 A1 | 7/2017 | Pendyala et al. |
| 2017/0200087 A1 | 7/2017 | Mascaro et al. |
| 2017/0220943 A1 | 8/2017 | Duncan et al. |
| 2017/0236131 A1 | 8/2017 | Nathenson et al. |
| 2017/0270526 A1 | 9/2017 | Fitzgerald |
| 2017/0300933 A1 | 10/2017 | Mascaro et al. |
| 2017/0308960 A1 | 10/2017 | Mascaro et al. |
| 2017/0315791 A1 | 11/2017 | Mascaro et al. |

OTHER PUBLICATIONS

Rokach et al., "Top-Down Induction of Decision Trees Classifiers—A Survey," IEEE Transactions on Systems, Man, and Cybernetics—Part C: Applications and Reviews, vol. 35, No. 4, Nov. 2005, pp. 476-487.

Araujo et al., "Ensemble Forecasting of Species Distributions," ScienceDirect Trends in Ecology and Evolution, vol. 22, No. 1, Sep. 29, 2006, pp. 42-47.

Agrawal et al., "Thompson Sampling for Contextual Bandits with Linear Payoffs," Proceedings of the 30$^{th}$ International Conference on Machine Learning, Atlanta, Georgia, USA, JMLR: W&CP vol. 28, 2013, 9 pages.

Irsoy et al., "Budding Trees," 22$^{nd}$ International Conference on Pattern Recognition, 2014, pp. 3582-3587.

Bell et al., "The use of multi-criteria decision-making methods in the integrated assessment of climate change: implications for IA practitioners," Socio-Economic Planning Sciences vol. 37, Issue 4, Dec. 2003, pp. 289-316, Elsevier Science Ltd.

Lee et al., "The Internet of Things (IoT): Applications, investments, and challenges for enterprises," Business Horizons vol. 58, Issue 4, Jul.-Aug. 2015, pp. 431-440, Elsevier Inc.

Poyarkov et al., "Boosted Decision Tree Regression Adjustment for Variance Reduction in Online Controlled Experiments," KDD '16 Proceedings of the 22$^{nd}$ ACM SIGKDD International Conference on Knowledge Discovery Data Mining, pp. 235-244, ACM Digital Library.

Armbrust et al., "Scaling Spark in the Real World," Proceedings of the VLDB Endowment; [ACM Digital Library], Association of

(56) References Cited

OTHER PUBLICATIONS

Computing Machinery, New York, NY, vol. 8, No. 12, pp. 1840-1843, Aug. 1, 2015.

Breuker, "Towards Model-Driven Engineering for Big Data Analytics—An Exploratory Analysis of Domain-Specific Languages for Machine Learning," 2014 47th Hawaii International Conference on System Sciences, IEEE, pp. 758-767, Jan. 6, 2014.

Chan et al., "PredictionIO: A Distributed Machine Learning Server for Practical Software Development," Proceedings of the 22nd ACM International Conference on Information & Knowledge Management, CIKM '13, pp. 2493-2496, Nov. 2013.

Zaharia et al., "Resilient Distributed Datasets: A Fault-Tolerant Abstraction for In-Memory Cluster Computing," USENIX, USENIX, The Advanced Computer Systems Association, pp. 1-14, Apr. 11, 2013.

Said, Jeremy, "Why Segmentation is the Key to Any AB Testing Strategy," first published on Jul. 22, 2014. Source: Wayback Machine at https://www.jeremysaid.com/blog/segmentation-secret-ab-testing-strategy, 8-pages.

* cited by examiner

FIG. 2

USER EXPERIENCE OPTION B intuit TurboTax.    Get Started   Products & Pricing   Help   Tools & Tips   After You File   [Sign In]

No matter your tax situation, we have you covered

| Compare our product features | Federal Free Edition<br>Simple tax returns (1040EZ/1040A)<br>[Start for Free]<br>Free federal<br>State additional | Deluxe<br>Maximize your tax deductions<br>[Start for Free]<br>$54.99*<br>State additional<br>MOST POPULAR* | Premier<br>Investments and rental property<br>[Start for Free]<br>$79.99*<br>State additional | Home & Business<br>Small business owner or sole proprietor<br>[Start for Free]<br>$104.99*<br>State additional |
|---|---|---|---|---|
| Easy prep, print and efile | ○ | ○ | ○ | ○ |
| Automatically imports your W-2 tax forms | ○ | ○ | ○ | ○ |
| Transfers last year's TurboTax return | | ○ | ○ | ○ |
| Searches 350+ tax deductions and credits (1040, Schedule A) | | ○ | ○ | ○ |
| Maximizes mortgage/property tax deductions (Schedule A) | | ○ | ○ | ○ |
| Includes ItsDeductible™ for charitable donations | | ○ | ○ | ○ |
| Covers miscellaneous income and some related expenses (1099-MISC) | | ○ | ○ | ○ |

GENERATING SECOND PERSONALIZED USER EXPERIENCE DISPLAY DATA, REPRESENTING A SECOND OF THE PLURALITY OF PERSONALIZED USER EXPERIENCE DISPLAYS, FOR THE SECOND PERCENTAGE OF THE FIRST OF THE PLURALITY OF SEGMENTS OF USERS, BY COMBINING THE SECOND OF THE USER EXPERIENCE OPTIONS WITH THE ADDITIONAL USER INTERFACE CONTENT FOR THE SECOND PERCENTAGE OF THE FIRST OF THE PLURALITY OF SEGMENTS OF USERS

1130

DISTRIBUTING THE FIRST PERSONALIZED USER EXPERIENCE DISPLAY DATA TO THE FIRST PERCENTAGE OF THE FIRST OF THE PLURALITY OF SEGMENTS OF USERS AND THE SECOND PERSONALIZED USER EXPERIENCE DISPLAY DATA TO THE SECOND PERCENTAGE OF THE FIRST OF THE PLURALITY OF SEGMENTS OF USERS, TO INCREASE A LIKELIHOOD THAT THE FIRST OF THE PLURALITY OF SEGMENTS OF USERS PERFORM THE ONE OR MORE ACTIONS, AND TO CONCURRENTLY VALIDATE AN EFFECTIVENESS OF THE FIRST OF THE USER EXPERIENCE OPTIONS IN CAUSING THE FIRST PERCENTAGE OF THE FIRST OF THE PLURALITY OF SEGMENTS OF USERS TO PERFORM THE ONE OR MORE ACTIONS WHILE TESTING AN EFFECTIVENESS OF THE SECOND OF THE USER EXPERIENCE OPTIONS IN CAUSING THE SECOND PERCENTAGE OF THE FIRST OF THE PLURALITY OF SEGMENTS OF USERS TO PERFORM THE ONE OR MORE ACTIONS

FIG. 11C

METHOD AND SYSTEM FOR PROVIDING PERSONALIZED USER EXPERIENCES IN COMPLIANCE WITH SERVICE PROVIDER BUSINESS RULES

BACKGROUND

Federal and State Tax law has become so complex that it is now estimated that each year Americans alone use over 6 billion person hours, and spend nearly 4 billion dollars, in an effort to comply with Federal and State Tax statutes. Given this level of complexity and cost, it is not surprising that more and more taxpayers find it necessary to obtain help, in one form or another, to prepare their taxes. Tax return preparation systems, such as tax return preparation software programs and applications, represent a potentially flexible, highly accessible, and affordable source of tax preparation assistance. However, traditional tax return preparation systems are, by design, fairly generic in nature and often lack the malleability to meet the specific needs of a given user.

For instance, traditional tax return preparation systems often present a fixed, e.g., predetermined and pre-packaged, structure or sequence of questions to all users as part of the tax return preparation interview process. This is largely due to the fact that the traditional tax return preparation system analytics use a sequence of interview questions, and/or other user experiences, that are static features and that are typically hard-coded elements of the tax return preparation system and do not lend themselves to effective or efficient modification. As a result, the user experience, and any analysis associated with the interview process and user experience, is a largely inflexible component of a given version of the tax return preparation system. That is, there is little or no opportunity for any analytics associated with the interview process, and/or user experience, to evolve to meet a changing situation or the particular needs of a given taxpayer, even as more information about that taxpayer, and their particular circumstances, is obtained.

As an example, using traditional tax return preparation systems, the sequence of questions, and the other user experience elements, presented to a user are pre-determined based on a generic user model that is, in fact and by design, not accurately representative of any "real world" user. Consequently, irrelevant, and often confusing, interview questions are virtually always presented to any given real-world user. It is therefore not surprising that many users, if not all users, of these traditional tax return preparation systems experience, at best, an impersonal, unnecessarily long, confusing, and complicated, interview process and user experience. Clearly, this is not the type of impression that results in happy and loyal repeat customers.

Even worse is the fact that, in many cases, the hard-coded and static analysis features associated with traditional tax return preparation systems, and the resulting presentation of irrelevant questioning and user experiences, leads potential users of traditional tax return preparation systems, i.e., potential customers, to believe that the tax return preparation system is not applicable to them, and perhaps is unable to meet their specific needs. In other cases, the users simply become frustrated with these irrelevant lines of questioning and other user experience elements. Many of these potential users and customers then simply abandon the process and the tax return preparation systems completely, i.e., never become paying customers. Furthermore, the potential customers do not become proponents for the tax return preparation systems (e.g., by promoting the product to their friends and family), and may instead become opponents to the tax return preparation systems (e.g., by recommending against the use of the systems). Clearly, this is an undesirable result for both the potential user of the tax return preparation system and the provider of the tax return preparation system.

Some of the shortcomings associated with traditional software systems, e.g., tax return preparation systems, is a result of insufficient, inadequate, and/or antiquated testing techniques. Even if a service provider wanted to adjust or customize the user experience flow, it is difficult to quickly and efficiently ascertain user preferences for content and determine the effect of various types of content on users.

Addressing the shortcomings of traditional software systems, e.g., antiquated testing techniques, are further complicated by the need to retain user trust, maintain relationships between different one service providers, and uphold various business-related legal requirements for content. For example, while updating testing techniques, inadvertent application of inconsistent and/or conflicting content could, as described above, not only cause a user to lose trust in a software system, but repel the user and the user's associates from the software.

What is needed is a method and system for providing personalized user experiences in compliance with service provider business rules, according to various embodiments.

SUMMARY

Embodiments of the present disclosure address some of the shortcomings associated with traditional tax return preparation systems and other software systems by providing personalized user experiences to current users of a software system, with the content of the personalized user experience being in compliance with one or more business rules. For a segment of users of the software system, the software system identifies user preferences for user experience options and integrates the user preferences into personalized user experiences for delivery to the segment of users, according to one embodiment. For the segment of users of the software system, the software system dynamically, adaptively, and concurrently delivers and tests the effectiveness of and the user preferences for user experience options, based on observed performance of the user experience options within the segment of users, according to one embodiment. Based on user responses, the software system is configured to dynamically and adaptively send more of the user preferred user experience options and send less of the non-preferred user experience options to the segment of users, so that more current users of the software system receive user experience options that are aligned with the users' preferences for user experience options, according to one embodiment. The more the software system provides users with user experience options, the more likely the users are to perform one or more actions towards becoming paying customers, repeat customers, and/or satisfied customers, according to one embodiment.

Providing user experience options to users purely based on the users' preferences may be undesirable because some of the user preferences for user experience options may be in non-compliance with one or more business rules, according to one embodiment. For example, the users' determined preferences for one or more user experience options may conflict with the current version of the software system, may conflict with agreements between external organizations and the service provider of the software system, may not be optimized for the users' computing device hardware or software configurations, may be inconsistent with information provided to a user by the software system at an earlier time, may be redundant with information provided to a user by the software system at an earlier time, or may be in non-compliance with one or more other types business rules, according to one embodiment. Providing business rule non-compliant user experience options (integrated into personal user experiences) to current users of the software system can lead to user dissatisfaction, user frustration, feelings that the software system is wasting users' time, feelings that the software system does not understand the users' situation, damaged business relationships for the service provider of the software system, and the like.

The disclosed software system identifies user experience options preferred by segments of users, applies business rules to the identified user experience options, and filters out the non-compliant user experience options from being delivered to the current users, according to one embodiment. The software system applies the business rules to non-compliant user preferences for user experience options by comparing the content of a user experience option to the business rule, according to one embodiment. The software system filters non-compliant user experience options from being delivered to the current users by removing the non-compliant user experiences from one or more lists of user experience options that have been selected for delivery to the current users, according to one embodiment. In one embodiment, when the software system identifies a user experience option for delivery to a segment of users, the software system identifies a list of user experience options for delivery to the segment of users. By identifying a list of user experience options, the software system has one or more backup user experience options to deliver to a segment of users even if one or more of the user experience options in the list are filtered out for non-compliance, according to one embodiment.

The software system applies the business rules to the user experience options (or lists of user experience options) separately from determining the users' preferences for the user experience options, according to one embodiment. For example, the software system employs the business rules in a loop or in algorithmic logic that is external to or independent from an algorithmic logic (e.g., a decision tree) that is used to determine the users' preferences for the user experience options, according to one embodiment. By keeping the application of business rules separate from the determination of users' preferences for user experience options, the business rules and the algorithmic logic that is used to determine the users' preferences can be independently modified, improved, and/or optimized, according to one embodiment.

A user experience analytics model embodies the algorithmic logic that is used to determine the users' preferences for the user experience options, according to one embodiment. The software system uses the user experience analytics model to concurrently, dynamically and adaptively validate and test the effects of user experience options amongst groups of current users, as a new technique for A/B testing user experience options. The software system groups prior and current users into segments of users, based on the user characteristics (e.g., age, income, home ownership, time data, etc.) that are common to the segments of users. The user experience analytics model determines likely preferences for current users based on the preferences of prior users, and the software system applies at least two different user experience options to the current users of a segment to validate some users' preference for one of the user experience options and to test other users' preference for the other of the user experience options. By dynamically adapting the frequency with which the two different user experience options are delivered to current users of a particular segment, the software system dynamically adapts and improves the accuracy with which the software system delivers user experience options that are actually or likely to be preferred by the current users of the software system, according to one embodiment. The software system analyzes user responses to the user experience options to update the user experience analytics model and to dynamically adapt the personalization of the user experience options, at least partially based on feedback from users, according to one embodiment. In one embodiment, the software system is a tax return preparation system.

Embodiments of the disclosed software system provides superior testing results over traditional A/B testing, while seamlessly integrating feedback from the A/B testing into the software system. Traditional A/B testing is inefficient. For example, traditional A/B testing allocates control conditions to 50% of a set of users as a control group and allocates experimental conditions to 50% of the set of users as an experimental group, without regard to the likelihood of satisfactory performance of the control conditions over the test conditions or vice versa. The test conditions are typically set, until a critical confidence, e.g., 95% confidence, is reached. By contrast, the disclosed system dynamically allocates and re-allocates control conditions and test conditions concurrently, to enable the software system to both test new user experience options while providing users with personalized user experiences that they are probabilistically likely to prefer. As a result, more users of the software system are likely to be satisfied with the software system and are more likely to complete a predetermined/desired action (e.g., completing questions, visiting a sequence of web pages, file a tax return, etc.) because the users receive relevant and/or preferred user experience options sooner than the same users would with the implementation of traditional A/B testing techniques. The improvements in customer satisfaction and the increases in customers completing predetermined actions in the software system results in increased conversions of potential customers to paying customers, which translates to increased revenue for service providers, according to one embodiment.

By providing personalized user experiences to users of a software system, and by providing the personalized user experiences in compliance with business rules, implementation of embodiments of the present disclosure allows for significant improvement to the fields of user experience, electronic tax return preparation, data analytics, data collection, and data processing, according to one embodiment. As one illustrative example, by filtering business rule non-compliant user experience options from delivery to current users of a software system, embodiments of the present disclosure allows for progressing a user through software system user flows and/or tax return preparation sessions with fewer processing cycles and less communications bandwidth because the user is more likely to be satisfied and less likely to prematurely terminate his/her user session prior to completing a particular activity (e.g., filing a tax return). This reduces processing cycles and communications bandwidth because a satisfied user does not redundantly use processing cycles and bandwidth to reenter his/her information into competing tax return preparation system and/or software system. In other words, improving customer satisfaction, by personalizing the user experiences, reduces global energy consumption by reducing redundant efforts and inefficiencies associated therewith. As a result, embodiments of the present disclosure allow for improved processor performance, more efficient use of memory access and data storage capabilities, reduced communication channel bandwidth utilization, and therefore faster communications connections.

In addition to improving overall computing performance, by providing personalized user experience options that are in compliance with one or more business rules, implementation of embodiments of the present disclosure represent a significant improvement to the field of automated user experiences and, in particular, efficient use of human and non-human resources. As one illustrative example, by increasing personal preferences for user experience options and by reducing presentation of non-preferred/less-effective user experience options, the user can more easily comprehend and interact with digital user experience displays and computing environments, reducing the overall time invested by the user to the tax return preparation or other software system-related tasks. Additionally, selectively presenting user experience options to users, based on their user characteristics and in compliance with business rules, improves and/or increases the likelihood that a potential customer will be converted into a paying customer because the potential customer receives confirmation that the software system appears to understand the particular user's needs and preferences, according to one embodiment. Consequently, using embodiments of the present disclosure, the user experience is less burdensome, less time consuming and allows the user to dedicate more of his or her time to other activities or endeavors, while having confidence that the tax return preparation system and/or software system is adequately addressing the needs of the user.

BRIEF DESCRIPTION OF THE DRAWINGS

FIG. 2 is a diagram of examples of personalized user experiences, in accordance with one embodiment.

FIGS. 11A, 11B, and 11C area flow diagram of an example of a process for providing personalized user experiences, in compliance with business rules of a service provider, according to one embodiment.

Figure 1A:
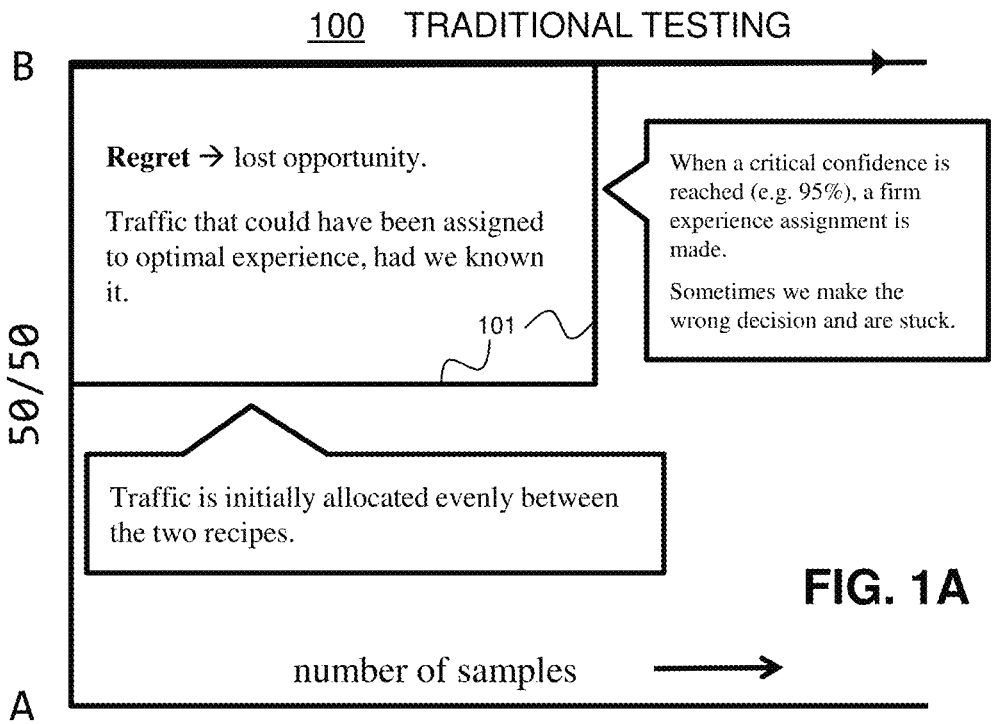
FIGS. 1A and 1B are graph diagrams of A/B testing techniques, in accordance with one embodiment.

Common reference numerals are used throughout the FIGs. and the detailed description to indicate like elements. One skilled in the art will readily recognize that the above FIGs. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs., which depict one or more exemplary embodiments.

Embodiments may be implemented in many different forms and should not be construed as limited to the embodiments set forth herein, shown in the FIGs., and/or described below. Rather, these exemplary embodiments are provided to allow a complete disclosure that conveys the principles of the invention, as set forth in the claims, to those of skill in the art.

The INTRODUCTORY SYSTEM and the PROCESS AND HARDWARE ARCHITECTURE sections herein describe systems and processes suitable for adaptively providing personalized user experiences in a software system, such as a tax return preparation system, according to various embodiments.

Introductory System

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets within one or more cloud or traditional computing environments.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/ communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features provided or displayed to the user such as, but not limited to the following: data entry fields; question quality indicators; images; backgrounds; avatars; highlighting mechanisms; icons; and any other features that individually, or in combination, create a user experience, as discussed herein, and/or as known in the art at the time of filing, and/or as developed after the time of filing.

As used herein, the term "user experience" includes not only the user session, interview process, interview process questioning, and/or interview process questioning sequence, but also other user experience features provided or displayed to the user such as, but not limited to, interfaces, images, assistance resources, backgrounds, avatars, highlighting mechanisms, icons, and any other features that individually, or in combination, create a user experience, as discussed herein, and/or as known in the art at the time of filing, and/or as developed after the time of filing.

Herein, the term "party," "user," "user consumer," and "customer" are used interchangeably to denote any party and/or entity that interfaces with, and/or to whom information is provided by, the disclosed methods and systems described herein, and/or a person and/or entity that interfaces with, and/or to whom information is provided by, the disclosed methods and systems described herein, and/or a legal guardian of person and/or entity that interfaces with, and/or to whom information is provided by, the disclosed methods and systems described herein, and/or an authorized agent of any party and/or person and/or entity that interfaces with, and/or to whom information is provided by, the disclosed methods and systems described herein. For instance, in various embodiments, a user can be, but is not limited to, a person, a commercial entity, an application, a service, and/or a computing system.

As used herein, the term "analytics model" or "analytical model" denotes one or more individual or combined algorithms or sets of equations that describe, determine, and/or predict characteristics of or the performance of a datum, a data set, multiple data sets, a computing system, and/or multiple computing systems. Analytics models or analytical models represent collections of measured and/or calculated behaviors of attributes, elements, or characteristics of data and/or computing systems.

As used herein, the terms "interview" and "interview process" include, but are not limited to, an electronic, software-based, and/or automated delivery of multiple questions to a user and an electronic, software-based, and/or automated receipt of responses from the user to the questions, to progress a user through one or more groups or topics of questions, according to various embodiments.

As used herein, the term "decision tree" denotes a hierarchical tree structure, with a root node, parent nodes, and children nodes. The parent nodes are connected to children nodes through edges, and edge logic between parent nodes and children nodes performs a gating function between parent nodes and children nodes to permit or block the flow of a path from a parent node to a child node. As used herein, a node is associated with a node action that a model or process performs on a data sample or on a set of data samples.

As used herein, the term "segment" denotes a portion, section, or subset of a set of users (i.e., a user set). A segment can include an entire set of users or a portion of a set of users. As used herein a segment or sub-segment denotes a portion, section, or subset of users who have one or more user characteristics (as defined below) in common.

As used herein, the term "distribution frequency rate" denotes decimal numbers, fractions, and/or percentages that represent an average quantity of traffic within a segment of users to which one or more user experience options are provided, with the software system. In alternative language, the term distribution frequency rate denotes decimal numbers, fractions, and/or percentages that represent an average quantity of traffic for a segment of users by which one or more user experience options are provided to a segment of users within a software system. For example, within a single segment of users, a first user experience option A is provided to users with a first distribution frequency rate, a second user experience option B is provided to users with a second distribution frequency rate, and the second distribution frequency rate is 1 minus the first distribution frequency rate, according to one embodiment and as disclosed further below.

As used herein, the term "uncertainty" denotes a quantification of noise, and noise represents the generation or receipt of results that are not representative of the probabilistic outcome for a data set. In other words, noise represents the difference in average or likely results between a small data sample set and a very large data sample set.

Process and Hardware Architecture

Disclosed herein is a production environment that includes a software system that provides personalized user experiences to current users of a software system, with the content of the personalized user experience being in compliance with one or more business rules. For a segment of users of the software system, the software system identifies user preferences for user experience options and integrates the user preferences into personalized user experiences for delivery to the segment of users, according to one embodiment. For the segment of users of the software system, the software system dynamically, adaptively, and concurrently delivers and tests the effectiveness of and the user preferences for user experience options, based on observed performance of the user experience options within the segment of users, according to one embodiment. Based on user responses, the software system is configured to dynamically and adaptively send more of the user preferred user experience options and send less of the non-preferred user experience options to the segment of users, so that more current users of the software system receive user experience options that are aligned with the users' preferences for user experience options, according to one embodiment. The more the software system provides users with user experience options, the more likely the users are to perform one or more actions towards becoming paying customers, repeat customers, and/or satisfied customers, according to one embodiment.

Providing user experience options to users purely based on the users' preferences may be undesirable because some of the user preferences for user experience options may be in non-compliance with one or more business rules, according to one embodiment. For example, the users' determined preferences for one or more user experience options may conflict with the current version of the software system, may conflict with agreements between external organizations and the service provider of the software system, may not be optimized for the users' computing device hardware or software configurations, may be inconsistent with information provided to a user by the software system at an earlier time, may be redundant with information provided to a user by the software system at an earlier time, or may be in non-compliance with one or more other types business rules, according to one embodiment. Providing business rule non-compliant user experience options (integrated into personal user experiences) to current users of the software system can lead to user dissatisfaction, user frustration, feelings that the software system is wasting users' time, feelings that the software system does not understand the users' situation, damaged business relationships for the service provider of the software system, and the like.

The disclosed software system identifies user experience options preferred by segments of users, applies business rules to the identified user experience options, and filters out the non-compliant user experience options from being delivered to the current users, according to one embodiment. The software system applies the business rules to non-compliant user preferences for user experience options by comparing the content of a user experience option to the business rule, according to one embodiment. The software system filters non-compliant user experience options from being delivered to the current users by removing the non-compliant user experiences from one or more lists of user experience options that have been selected for delivery to the current users, according to one embodiment. In one embodiment, when the software system identifies a user experience option for delivery to a segment of users, the software system identifies a list of user experience options for delivery to the segment of users. By identifying a list of user experience options, the software system has one or more backup user experience options to deliver to a segment of users even if one or more of the user experience options in the list are filtered out for non-compliance, according to one embodiment.

The software system applies the business rules to the user experience options (or lists of user experience options) separately from determining the users' preferences for the user experience options, according to one embodiment. For example, the software system employs the business rules in a loop or in algorithmic logic that is external to or independent from an algorithmic logic (e.g., a decision tree) that is used to determine the users' preferences for the user experience options, according to one embodiment. By keeping the application of business rules separate from the determination of users' preferences for user experience options, the business rules and the algorithmic logic that is used to determine the users' preferences can be independently modified, improved, and/or optimized, according to one embodiment.

A user experience analytics model embodies the algorithmic logic that is used to determine the users' preferences for the user experience options, according to one embodiment. The software system uses the user experience analytics model to concurrently, dynamically and adaptively validate and test the effects of user experience options amongst groups of current users, as a new technique for A/B testing user experience options. The software system groups prior and current users into segments of users, based on the user characteristics (e.g., age, income, home ownership, time data, etc.) that are common to the segments of users. The user experience analytics model determines likely preferences for current users based on the preferences of prior users, and the software system applies at least two different user experience options to the current users of a segment to validate some users' preference for one of the user experience options and to test other users' preference for the other of the user experience options. By dynamically adapting the frequency with which the two different user experience options are delivered to current users of a particular segment, the software system dynamically adapts and improves the accuracy with which the software system delivers user experience options that are actually or likely to be preferred by the current users of the software system, according to one embodiment. The software system analyzes user responses to the user experience options to update the user experience analytics model and to dynamically adapt the personalization of the user experience options, at least partially based on feedback from users, according to one embodiment. In one embodiment, the software system is a tax return preparation system.

Embodiments of the disclosed software system provides superior testing results over traditional A/B testing, while seamlessly integrating feedback from the A/B testing into the software system. Traditional A/B testing is inefficient. For example, traditional A/B testing allocates control conditions to 50% of a set of users as a control group and allocates experimental conditions to 50% of the set of users as an experimental group, without regard to the likelihood of satisfactory performance of the control conditions over the test conditions or vice versa. The test conditions are typically set, until a critical confidence, e.g., 95% confidence, is reached. By contrast, the disclosed system dynamically allocates and re-allocates control conditions and test conditions concurrently, to enable the software system to both test new user experience options while providing users with personalized user experiences that they are probabilistically likely to prefer. As a result, more users of the software system are likely to be satisfied with the software system and are more likely to complete a predetermined/desired action (e.g., completing questions, visiting a sequence of web pages, file a tax return, etc.) because the users receive relevant and/or preferred user experience options sooner than the same users would with the implementation of traditional A/B testing techniques. The improvements in customer satisfaction and the increases in customers completing predetermined actions in the software system results in increased conversions of potential customers to paying customers, which translates to increased revenue for service providers, according to one embodiment.

Figure 1B:
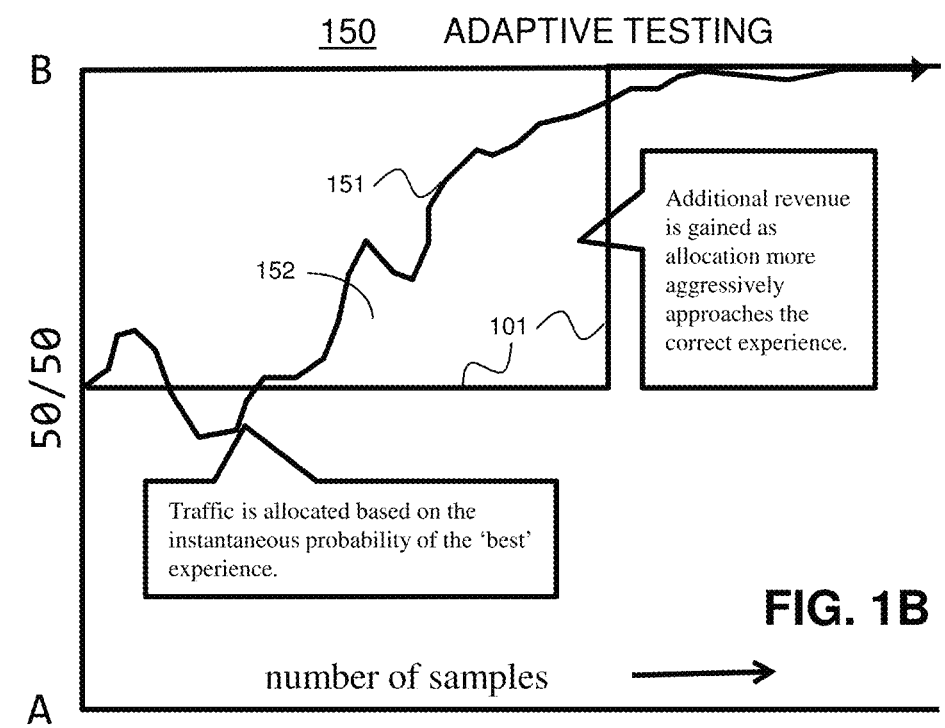

FIGS. 1A and 1B are graphical representations of some of the advantages of adaptive A/B testing over traditional A/B testing, according to one embodiment. FIG. 1A is an example of a graph 100 that illustrates delivery of a condition A to 50% of a user set and delivery of a condition B to 50% of a user set for a number of samples (x-axis), using traditional A/B testing techniques. Conditions A and B are equally distributed to the user sets until a critical confidence level is reached, e.g., 95%. After the critical confidence level is reached, traditional testing techniques switch to delivering the more successful of the conditions to 100% of the user set. In the graph 100, the test switches at a number of samples, represented by graph line 101, that were tested until a confidence level (e.g., 95%) was reached. Everything above and to the left of the graph line 101 represents lost opportunity to provide condition B to the user set rather than condition A (condition A ultimately being deemed inferior).

FIG. 1B shows a graph 150 that illustrates an adaptive delivery of condition A (e.g., a first user experience option) and condition B (e.g., a second user experience option) to the user set while determining which condition is superior to the other, according to one embodiment. The graph 150 includes a graph line 151 that represents a percentage of condition B that is allocated to the user set, according to one embodiment. The area 152 that is under the graph line 151 illustrates that more users of the user set receive condition B sooner by using adaptive A/B testing instead of the traditional A/B testing illustrated by FIG. 1A, according to one embodiment. Importantly, providing condition B sooner equates to providing more users with user experiences that are in accordance with the users' preferences and that are more likely to assist users in completing or accomplishing a particular activity (e.g., providing personal information, paying for a service, signing up as a service provider customer, staying logged in to a user session, complete filing a tax return, etc.), according to one embodiment. Thus, implementation of adaptive testing by providing personalized user experiences in a software system, as disclosed herein, translates to increases in quantities of satisfied customers and improved revenue for the service provider of the software system, according to one embodiment. The systems, methods, algorithms, and techniques of FIGS. 3-11C disclose various embodiments that leverage the advantages of adaptive testing as described with respect to FIGS. 1A and 1B, according to one embodiment.

Figure 2:
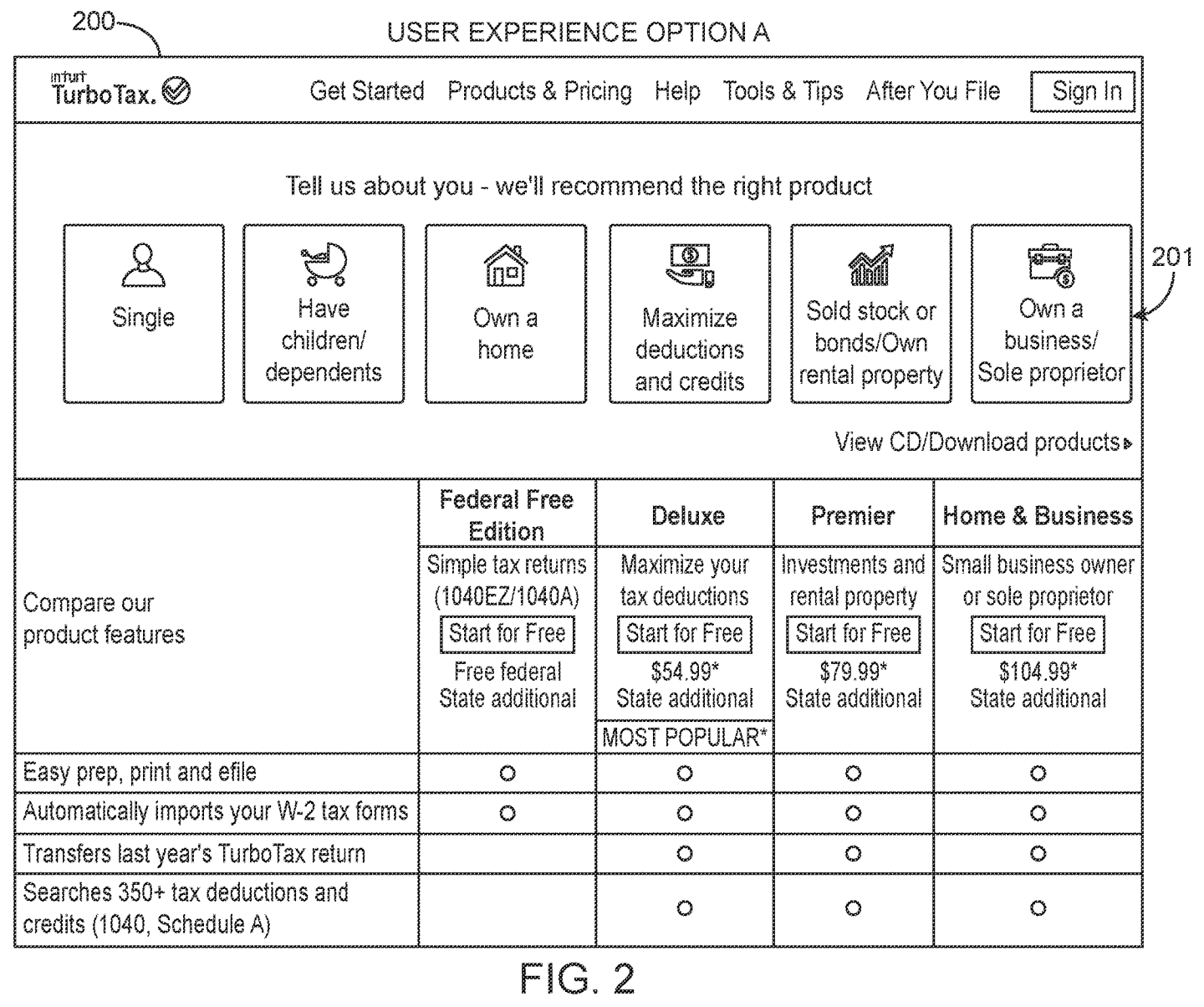

FIG. 2 illustrates an example embodiment of a personalized user experience 200 and a personalized user experience 210, which can be delivered to a user via a software system, at least partially based on characteristics of the user, to increase user satisfaction with the user experience and to cause the user to perform one or more actions (e.g., answer a question, provide personal information, file a tax return, remain logged in to the software system, etc.), according to one embodiment. The personalized user experiences 200 and 210 display several optional versions of a software system that can be purchased or used to prepare a tax return for the user, according to one embodiment. The personalized user experience 200 includes a number of icon buttons 201, representing a user experience option A, according to one embodiment. The personalized user experience 210 includes a text banner 211, representing a user experience option B, according to one embodiment. The analytics model used by the software system provides the personalized user experience 200 or the personalized user experience 210 to users, based on the user characteristics of the users, based on the segment associated with the users, and/or based on the likelihood that the users will have a preference for the user experience option A or the user experience option B, according to one embodiment. The personalized user experiences 200 and 210, the icon buttons 201, and the text banner 211, are merely a few examples of hundreds or thousands of possible variations of personalized user experiences and of user experience options that can be identified, generated, and/or delivered to users based on the users' preferences for user experience options, to encourage the users to perform one or more actions towards becoming a paying customer of a tax return preparation system or of another service provided by a service provider, according to one embodiment.

Figure 3:
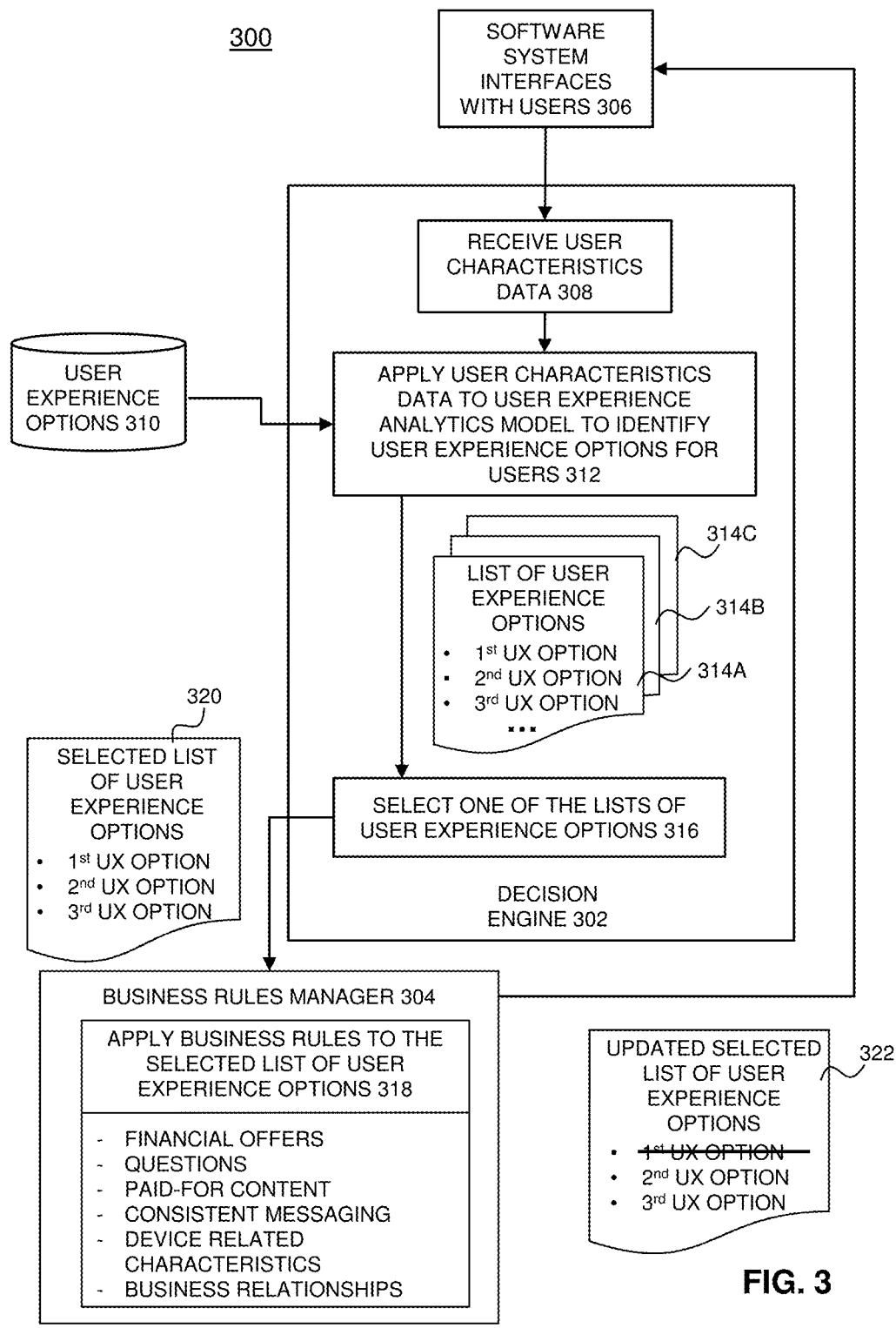
FIG. 3 is a flow diagram of an example of a process for providing personalized user experiences in compliance with one or more business rules.

FIG. 3 illustrates an example flow diagram of a process 300 for determining which one of a number of user experience options to use to provide personalized user experiences to one or more of a number of current users, in compliance with one or more business rules, according to one embodiment. The process 300 is a part of a larger system that validates the effectiveness of one or more first user experience options while concurrently testing the effectiveness of one or more second user experience options among current users of the software system. The effectiveness of the user experience option on a current user is judged or determined based on the actions the current user takes after receiving or being exposed to the user experience option, according to one embodiment. For example, if a group of users receive a user experience option A (e.g., a group of icon buttons at the top of a user interface page) and subsequently choose to continue using the product or choose to file their tax returns using the software system, then the effectiveness of the user experience option A may be deemed to be relatively high, according to one embodiment. The software system provides user experience options to current users based on the calculated/determined likelihood of the user experience options to cause the current users to perform one or more actions (e.g., continue using the software system, file a tax return with the software system, remain logged into the software system, progress to a subsequent user interface page/display in the software system, etc.), according to one embodiment. The software system dynamically and adaptively updates the rate by which user experience options are delivered to current users, based on the responses and/or actions of users who receive the user experience options as part of validation or testing the user experience options, according to one embodiment.

The flow diagram of the process 300 includes a decision engine 302 and a business rules manager 304 for determining which one of a number of user experience options to use to provide personalized user experiences to users, in compliance with one or more business rules, according to one embodiment. The decision engine 302 identifies user experience options that are likely to be preferred by current users, based on the user characteristics of the current users, according to one embodiment. The business rules manager 304 receives user experience options that have been identified and selected for delivery to users, and applies one or more business rules to the selected user experience options to filter out one or more user experience options that are non-compliant with one or more of the business rules, according to one embodiment.

At operation 306, a software system interfaces with users, according to one embodiment. Interfacing with users can include, but is not limited to, collecting user characteristics, providing introductory information, enabling the user to log into a tax return preparation system or other software system, progressing a user through a tax return preparation sequence of questions, collecting clickstream information from the user, and the like, according to one embodiment. The system also uses the selected user experience options to generate personalized user experiences that are delivered to the current users of the software system, according to one embodiment.

At operation 308, the decision engine 302 receives user characteristics data, according to one embodiment. The decision engine 302 receives the user characteristics data from one or more other modules or components in the software system, e.g., in the tax return preparation system, according to one embodiment. An expanded list of examples of user characteristics are provided below in connection with the production environment 400, however, user characteristics (represented by user characteristics data) include, but are not limited to, marital status, home ownership status, income range, number of children, employment status, a zip code, state of residence, gender, age, whether the user's computing device is a mobile computing device or desktop computing device, brand of computing device (e.g., Apple, Android, Windows, etc.), type of operating system executed by the computing device (e.g., Windows, iOS, Mac OS, Linux, etc.), and the like, according to one embodiment.

The flow diagram of the process 300 also includes user experience options 310, according to one embodiment. The user experience options 310 are stored in a table, a database, or one or more other data structures, according to one embodiment. An expanded list of examples of user experience options are provided below in connection with the production environment 400, however, user experience options 310 include, but not limited to, buttons, pictures, background color, foreground color, location of user interface elements, dialog boxes, text boxes, radio buttons, drop-down menus, audio media, video media, types of questions, the format of questions, the number of questions, the sequence/order of questions, the type of topics presented, the number of topics presented, the sequence of topics presented, prices for services, marketing offers, customer support offers, types of customer support communications, other user interface elements, and the like, according to one embodiment.

At operation 312, the decision engine 302 applies user characteristics data to a user experience analytics model to identify user experience options for current users, according to one embodiment. In one embodiment, the user experience analytics model identifies lists of user experience options 314A, 314B, and 314C (collectively, lists of user experience options 314) that are relevant to user preferences of current users, based on the user characteristics data for the current users, according to one embodiment. The lists of user experience options 314 are determined to be preferable (or likely preferable) to one or more current users having the user characteristics received at operation 308, according to one embodiment. For each unique set of user characteristics, the decision engine 302 may generate different lists of user experience options 314, according to one embodiment.

The user experience analytics model applied by the decision engine 302 includes an algorithm or implementation of a decision tree, according to one embodiment. The decision tree causes the user experience analytics model to categorize current users into segments of users, based on the user characteristics data of the current users, according to one embodiment. The decision tree causes the user experience analytics model to generate/identify the lists of user experience options 314 based on the segment of users into which particular users have been categorized, according to one embodiment.

The decision engine 302 uses the user experience analytics model to identify two or more lists of user experience options 314, for each segment of users, which have the highest likelihood of being preferred by the current users of a particular segment of users, according to one embodiment. Each list of user experience options 314 is associated with a likelihood of effectiveness for (or a performance with) a particular segment of users, according to one embodiment. The likelihood of effectiveness of a user experience option is used interchangeably with the performance of a user experience option, according to one embodiment. The user experience analytics model generates the likelihood of effectiveness for each list of user experience options 314 to enable the decision engine 302 to determine a distribution frequency rate with which to distribute two or more of the lists of user experience options 314 to users who are categorized into a particular segment of users, according to one embodiment.

The user experience analytics model identifies two or more lists of user experience options 314 for delivery to each segment of users in order to concurrent validate the effectiveness of one user experience option (or list of user experience options) while testing the effectiveness of one or more other user experience options (or lists of user experience options), according to one embodiment. The software system dynamically and adaptively validates and tests multiple user experience options on a set of current users to rapidly and accurately determine users' preferences for user experience options, according to one embodiment. The rate by which the software system distributes one user experience options over another user experience option to a segment of users is the distribution frequency rate, according to one embodiment.

In one embodiment, the likelihood of effectiveness for each list of user experience options 314 is the same as the distribution frequency rate by which the decision engine 302 distributes the list of user experience options 314 to a particular segment of users, according to one embodiment. For example, the user experience analytics model can generate the list of user experience options 314A having a likelihood of effectiveness of 0.6, the list of user experience options 314B having a likelihood of effectiveness of 0.3, and the list of user experience options 314C having a likelihood of effectiveness of 0.1, according to one embodiment. The decision engine 302, in this example, would distribute the list of user experience options 314A to 6 out of every 10 users of a segment of users, would distribute the list of user experience options 314B to 3 out of every 10 users of the segment of users, and would distribute the list of user experience options 314C to 1 out of every 10 users of the segment of users. Because each segment of users have at least some user characteristics that are different than each of the other segments of users categorized by the user experience analytics model, the likelihood of effectiveness and/or the distribution frequency rates generated by the user experience analytics model can be different for each of the segments of users, according to one embodiment.

Each of the lists of user experience options 314 include multiple user experience options 310, according to one embodiment. For example, the list of user experience options 314A includes a first user experience option, a second user experience option, and a third user experience option, according to one embodiment. Providing multiple user experience options 310 within each of the lists of user experience options 314 enables the software system to have one or more backup user experience options, just in case one or more of the selected user experience options fails to comply with the business rules, according to one embodiment. Although each list of user experience options 314 includes multiple user experience options, in one embodiment, only one of the multiple user experience options in a list is provided to each user, to validate or test the effectiveness of particular user experience options in causing users to perform one or more actions, according to one embodiment. Each of the lists of user experience options 314 can include first, second, and third user experience options that are different than the first, second, and third user experience options of each other one of the lists of user experience options 314, according to one embodiment. In another embodiment, one or more of the first, second, and third user experience options in the various lists of user experience options 314 can overlap or be the same in other ones of the list of user experience options 314, according to one embodiment.

In one embodiment, the decision engine 302 uses the user experience analytics model to identify two or three user experience options for delivery to a segment of users to test the effectiveness of just the two or three identified user experience options. The software system delivers the identified user experience options to the current users in proportion with the effectiveness of the user experience options among a segment of users, according to one embodiment. The effectiveness of the user experience options among the segment of users is determined by evaluating the performance of the user experience options among previous users of the software system, according to one embodiment.

At operation 316, the decision engine 302 selects one of the lists of user experience options 314 for delivery to a user, according to one embodiment. The selected one of the lists of user experience options 314 is identified as a selected list of user experience options 320, according to one embodiment. The decision engine 302 pseudo-randomly selects one of the lists of user experience options 314 for delivery to a user, at least partially based on the likelihood of effectiveness of the list (e.g., in accordance with the distribution frequency rate for a segment of users), according to one embodiment.

At operation 318, the business rules manager 304 applies business rules to the selected list of user experience options 320, according to one embodiment. The business rules manager 304 applies the business rules by filtering out or removing one or more of the non-compliant user experience options from the selected list of user experience options 320, according to one embodiment. If the first user experience option of the list complies with the business rules, then the first user experience option of the selected list of user experience options 320 is integrated into a personalized user experience for the user, according to one embodiment. If the first user experience option of the selected list of user experience options 320 fails to comply with one or more business rules, then the business rules manager 304 generates an updated selected list of user experience options 322 that is without the first (or other) non-compliant user experience option, according to one embodiment. The updated selected list of user experience options 322 does not include the non-compliant user experience option, according to one embodiment. If one or more of the user experience options of the selected list of user experience options 320 are non-compliant with the business rules, then the software system uses the highest-ranking user experience option from the updated selected list of user experience options 322 to integrate into a personalized user experience for the user, according to one embodiment.

The business rules manager 304 operates independently of the user experience analytics model, so that the user experience analytics model can dynamically and adaptively validate and test user experience options in order to determine user preferences for the user experience options, according to one embodiment.

The business rules applied by the business rules manager 304 can be defined by a service provider of the software system, can be updated/modified by a system administrator, and/or can be defined at least partially based on the use of the software system, according to one embodiment. The business rules include, but are not limited to, rules relating to financial offers, rules relating to questions provided, rules relating to paid-for content, rules relating to consistent messaging, rules relating to a user's device characteristics, and business relationships of the service provider of the software system (e.g., tax return preparation system), according to one embodiment. The business rules include, but are not limited to, rules to maintain consistency in a tax return preparation sequence of content, rules about prohibited content based on the relationship of a user with the service provider of the software system, rules about mandatory content based on the relationship of a user with the service provider of the software system, rules about prohibited content based on the relationship between a service provider of the software system and other organizations (e.g., businesses, educational institutions, non-profit organizations, etc.), rules about content that should be shown to a user based on the relationship between a service provider of the software system and other organizations, and/or other rules that are related to the operation of the service provider that is hosting/providing the software system, according to one embodiment. For example, if a user experience option related to home ownership or marital status is provided to a user early on in a tax return preparation session, the business rules may prohibit the delivery of a redundant or similar content from being provided later in the tax return preparation session (even though the analytics model determines that the user is likely to prefer the content) to avoid causing frustration or other trust-reducing emotions in the user. If the user feels like the tax return preparation session or other user experience session is redundant or inconsistent, the user may receive the false impression that the software system does not or cannot understand the needs of the user. The user may also become frustrated and choose to quit the tax return preparation session (or other user experience session) and fail to convert to a paying user of the service provided by the software system.

Another example of a business rule includes having the software system include or favor information identifying an employer, a financial institution, or another organization that is paying for the user's use of the software system, according to one embodiment. Similarly, the business rule may cause the software system to exclude or omit particular messaging that is in conflict with an agreement between the service provider of the software system and one or more of an employer, a financial institution or another organization that is paying for the user's use of the software system, according to one embodiment.

Another example of a business rule includes not providing user experience options to a user that conflict with user characteristics for a user. For example, the business rule can include filtering out user experience options that are optimized for one type of web browser (e.g., Google Chrome), when the user is accessing the software system with another type of web browser (e.g., Internet Explorer or Safari). As another example, the business rule can include filtering out user experience options about ages of children, when the user characteristics of the user indicate that the user is childless.

Figure 4:
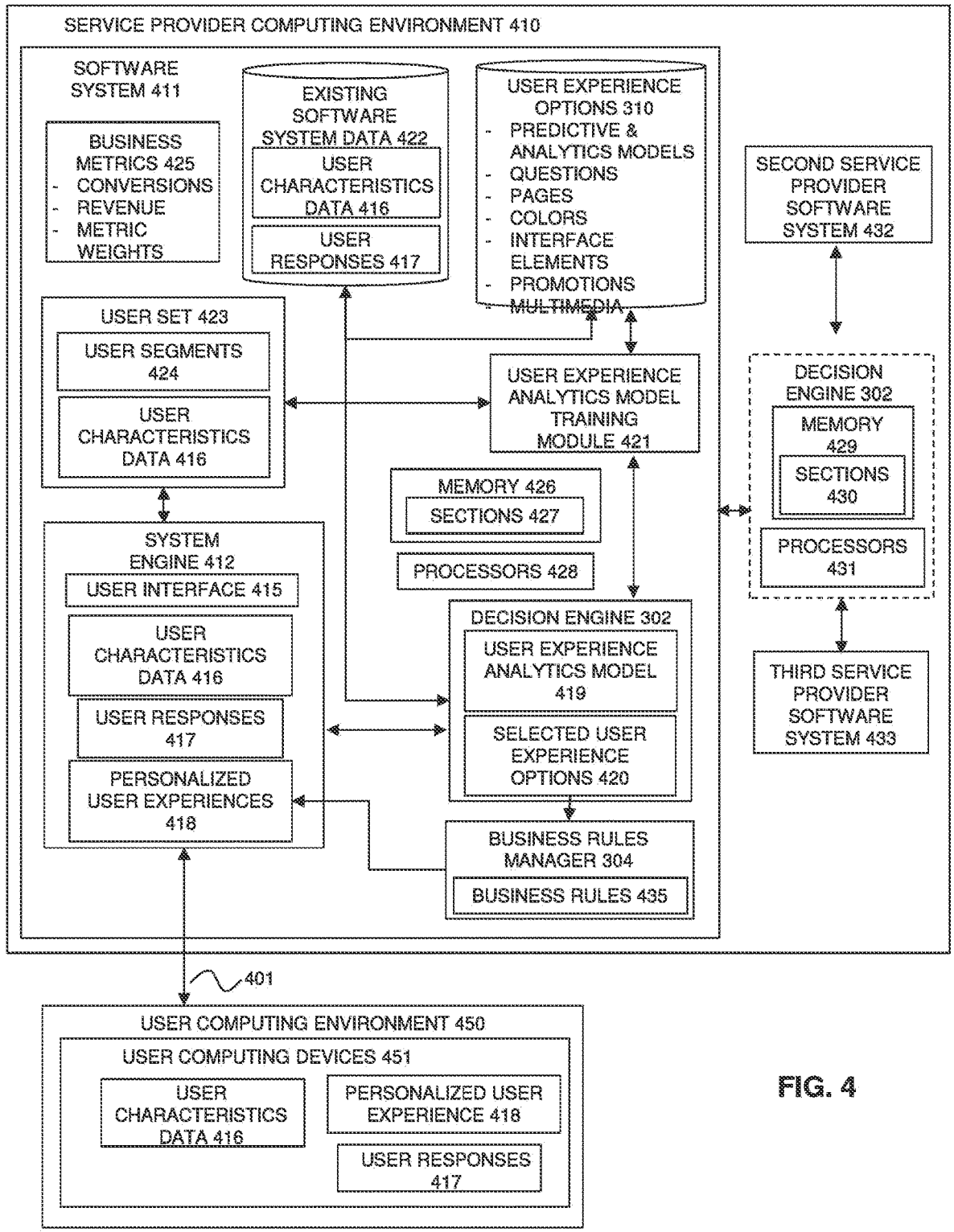
FIG. 4 is a block diagram of an example architecture for adaptively providing personalized user experiences that are in compliance with one or more business rules, in accordance with one embodiment.

FIG. 4 illustrates an example embodiment of a production environment 400 for, in a software system, adaptively providing personalized user experiences in compliance with one or more business rules. The production environment 400 incorporates one or more components, elements, and operations from the process 300 (shown in FIG. 3), to provide the personalized user experience, in compliance with one or more business rules managed by a business rules manager 304, according to one embodiment. The production environment 400 includes a service provider computing environment 410 and a user computing environment 450 to deliver personalized user experiences to users of a software system, to cause the users to perform one or more particular actions (e.g., answer a sequence of questions, continue use of the software system, file a tax return, etc.), according to one embodiment. The computing environments 410 and 450 are communicatively coupled to each other with a communication channel 401, according to one embodiment.

The service provider computing environment 410 represents one or more computing systems such as, but not limited to, a server, a computing cabinet, and/or distribution center that is configured to receive, execute, and host one or more applications for access by one or more users, e.g., clients of the service provider, according to one embodiment. The service provider computing environment 410 represents a traditional data center computing environment, a virtual asset computing environment (e.g., a cloud computing environment), or a hybrid between a traditional data center computing environment and a virtual asset computing environment, to host one or more software systems, according to one embodiment. The one or more software systems can include, but are not limited to tax return preparation systems, other financial management systems, and applications that support the tax return preparation systems and/or the other financial management systems, according to one embodiment. The service provider computing environment 410 includes a software system 411 that adaptively provides personalized user experiences by providing users with user experience options in accordance with distribution frequency rates, at least partially based on user characteristics for the users, according to one embodiment. By adaptively providing personalized user experiences, the software system 411 improves user satisfaction, increases service provider revenue, facilitates user interactions with user interfaces, determines user preferences for user experience options, while concurrently, automatically, and seamlessly increasing the distribution of well-performing user experience options to users of the software system 411, according to one embodiment. The software system 411 includes various components, databases, engines, modules, and data to support adaptively providing personalized user experiences to users of the software system 411, in accordance with one or more business rules, according to one embodiment. The software system 411 includes a system engine 412, user experience options 310, a decision engine 302, and the business rules manager 304 (described in process 300 and shown in FIG. 3), according to one embodiment.

The system engine 412 is configured to communicate information between users and the software system 411, according to one embodiment. The system engine 412 executes/hosts a user interface 415, according to one embodiment. The system engine 412 executes/hosts the user interface 415 to receive user characteristics data 416 and to receive user responses 417 from users, in response to personalized user experiences 418 provided to the users by the software system 411, according to one embodiment. The user interface 415 includes one or more user experience elements and graphical user interface tools, such as, but not limited to, buttons, slides, dialog boxes, text boxes, drop-down menus, banners, tabs, directory trees, links, audio content, video content, and/or other multimedia content for communicating information to the user and for receiving the information from users, according to one embodiment.

The system engine 412 and/or the software system 411 communicates with the user through the user computing environment 450, according to one embodiment. The user computing environment 450 includes user computing devices 451 that are representative of computing devices or computing systems used by users to access, view, operate, and/or otherwise interact with the software system 411, according to one embodiment. The term "users" and "user computing devices" are used interchangeably to represent the users of the software system 411, according to one embodiment. Through the user computing devices 451, users provide the user characteristics data 416 and provide the user responses 417 to the software system 411, in response to receipt of the personalized user experiences 418, according to one embodiment.

The user characteristics data 416 represents user characteristics for users of the software system 411, according to one embodiment. The user characteristics data 416 includes information from existing software system data 422, such as one or more previous years' tax return data for a particular user and previous user interactions with the software system 411, according to one embodiment. The user characteristics data 416 is stored in a data store, a database, and/or a data structure, according to one embodiment. The user characteristics data 416 also includes information that the software system 411 gathers directly from one or more external sources such as, but not limited to, a payroll management company, state agencies, federal agencies, employers, military records, public records, private companies, and the like, according to one embodiment. Additional examples of the user characteristics (represented by the user characteristics data 416) include, but are not limited to, data indicating user computing system characteristics (e.g., browser type, applications used, device type, operating system, etc.), data indicating time-related information (hour of day, day of week, etc.), data indicating geographical information (latitude, longitude, designated market area region, etc.), data indicating external and independent marketing segments, data identifying an external referrer of the user (e.g., paid search, add click, targeted email, etc.), data indicating a number of visits made to a service provider website, a user's name, a Social Security number, government identification, a driver's license number, a date of birth, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, IRA distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial system, or in the preparation of a user's tax return, according to various embodiments.

The system engine 412 provides personalized user experiences 418, by populating and/or using one or more user experience options 310 in the personalized user experiences 418, according to one embodiment. The user experience options 310 include predictive and analytics models that can be used to determine relevant topics to present to the user; questions to present to user; sequences of topics to present to user; sequences of questions to present to user; and the like, according to one embodiment. The user experience options 310 also include, but are not limited to, questions, webpages, sequences of pages, colors, interface elements, positioning of interface elements within webpages, promotions that can be offered to users, audio files, video files, other multimedia, and the like, according to various embodiments.

Users of the software system 411 have individual preferences, technical competency levels, levels of education, levels of comfort using digital technologies, and other distinctive or individual characteristics that increase the value of personalized user experiences of the software system 411 for the users. To improve the likelihood of satisfaction of the user with his experience with the software system 411, the system engine 412 selectively applies one or more of the user experience options 310 to the personalized user experiences 418 while facilitating interactions between the software system 411 and the users, according to one embodiment.

The software system 411 uses the decision engine 302 to identify which user experience options 310 to apply to the personalized user experiences 418, in order to facilitate or promote one or more particular user actions (e.g., such as completing a set of questions, continuing to use the software system 411, filing a tax return with the software system 411, etc.), according to one embodiment. The decision engine 302 is configured to receive the user characteristics data 416, receive the user experience options 310, and select one or more of the user experience options 310 for the system engine 412 to integrate into the personalized user experiences 418 for users of the software system 411, according to one embodiment.

The decision engine 302 applies the user characteristics data 416 and the user experience options 310 to a user experience analytics model 419, to determine which user experience options 310 to apply to users with particular user characteristics, according to one embodiment. The user experience analytics model 419 returns distribution frequency rates for user experience options 310, based on the user characteristics data 416, according to one embodiment. The distribution frequency rates define a frequency with which users having particular user characteristics are provided with particular user experience options, according to one embodiment. In one embodiment, users are provided with particular user experience options, for example, via a universal resource locator ("URL") that the user can select or click. In one embodiment, selected user experience options are delivered to users by modifying the content of personalized user experiences 418.

The decision engine 302 uses the distribution frequency rates from the user experience analytics model 419 to generate a weighted pseudo-random number that represents the one or more user experience options that are to be provided to a user based on the user's user characteristics data, according to one embodiment. Examples of distribution frequency rates include 0.2 for a first user experience option (or first list of user experience options), 0.5 for a second user experience option (or second list of user experience options), and 0.3 for a combination of one or more other user experience options (or other lists of user experience options), according to one embodiment. In practice, 0.2, 0.5, and 0.3 distribution frequency rates means that for a particular user characteristic, 2 out of 10 users receive the first user experience option (or first list of user experience options), 5 out of 10 users receive the second user experience option (or second list of user experience options), and 3 out of 10 users receive the combination of one or more other user experience options (or other lists of user experience options), according to one embodiment. The decision engine 302 uses the distribution frequency rates and the weighted pseudo-random number to identify selected user experience options 420, for delivery to the user, according to one embodiment. The selected user experience options 420 includes the selected list of user experience options 320 (shown in FIG. 3), according to one embodiment.

While the user experience options 310 are described as experience elements/features that are added to the personalized user experiences 418, the selected user experience options 420 can also include the omission of one or more user experience options 310. For example, the user experience analytics model 419 can be configured to generate distribution frequency rates of 0.8 and 0.2 for determining whether or not to display large icons in the personalized user experiences 418, according to whether the age, income level, employment status, education level, or other user characteristic is above or below one or more thresholds that are set within the user experience analytics model 419, according to one embodiment. In other words, the output of the user experience analytics model 419 can be Boolean and can simply determine whether a user receives a user experience option or not, based on the user's user characteristics, according to one embodiment.

The software system 411 uses, executes, and/or operates a user experience analytics model training module 421 to train (e.g., initialize and update) the user experience analytics model 419, according to one embodiment. The user experience analytics model training module 421 retrieves user characteristics data 416 from the existing software system data 422 and retrieves user experience options 310 for use in training the user experience analytics model 419, according to one embodiment. The user experience analytics model training module 421 initializes and/or updates the user experience analytics model 419 using techniques that include, but are not limited to, regression, logistic regression, decision trees, artificial neural networks, support vector machines, linear regression, nearest neighbor methods, distance based methods, Naive Bayes, linear discriminant analysis, k-nearest neighbor algorithm, and/or another mathematical, statistical, logical, or relational algorithms to determine correlations and/or other relationships between the user characteristics data and the performance of user experience options on segments of users, according to one embodiment.

In one embodiment, the user experience analytics model training module 421 defines a user set 423 that is based on all or part of the users that have interacted with the software system 411 and/or for whom user characteristics data 416 has been gathered or received. The user experience analytics model training module 421 defines a number of user segments 424 around subsets of commonly held user characteristics. In other words, the user segments 424 are subsets of the user set 423, and each of the user segments 424 have one or more user characteristics in common, according to one embodiment. As used herein, the term "user segment(s)" is used interchangeably with the term "segment(s) of users".

The user experience analytics model training module 421 trains the user experience analytics model 419 by generating a decision tree, based on how particular user experience options 310 perform with particular user segments 424, according to one embodiment. The user experience analytics model training module 421 generates a decision tree as part of the analytics logic for the user experience analytics model 419, to facilitate generating distribution frequency rates. The processes 300, 500, 700, 800, 900, and 1000 of FIGS. 3, 5, 7, 8, 9, and 10 respectively, disclose particular embodiments that may be used by the user experience analytics model training module 421 for initializing and/or updating the user experience analytics model 419, according to one embodiment.

The software system 411 adapts to user responses 417 received from users, to update the user experience analytics model 419, and to dynamically and adaptively improve the personalized user experiences 418, according to one embodiment. The software system 411 is configured to store/update user characteristics data 416 and user responses 417, as the existing software system data 422, during the operation of the software system 411. After a predetermined period of time, such as, but not limited to, an hour, a day, semi-weekly, weekly, biweekly, and the like, the user experience analytics model training module 421 retrieves the user experience options 310, the user characteristics data 416, the user responses 417, and the business metrics 425 to determine the performance of the user experience options 310 and to update the user experience analytics model 419, based on the performance of the user experience options 310, according to one embodiment. Particular embodiments for initializing and/or updating the user experience analytics model 419 are disclosed below in the processes 300, 500, 700, 800, 900, and 1000 and in the corresponding FIGS. 3, 5, 7, 8, 9, and 10 respectively, according to one embodiment.

The business metrics 425 include, but are not limited to, the various metrics used by the software system 411 and/or the service provider of the software system 411 to evaluate the success, failures and/or the performance of the user experience options 310, according to one embodiment. The business metrics 425 include, but are not limited to, number of conversions of users from potential customers to paying customers, the percentage of conversions of potential customers to paying users, quantities of revenue, rates of revenue collected per user (e.g., average revenue collected per user), increases/decreases in revenue as compared to one or more previous years, months, weeks, days, and metric weights that are applied to conversions and revenues to establish a relative importance of conversions verses revenue generation. The business metrics 425 can also include records of other actions taken by users, such as, but not limited to, numbers of questions answered, duration of use of the software system 411, number of pages or user experience displays visited within a software system 411, use of customer support, and the like, according to one embodiment.

Each of the selected user experience options 420 (which includes a selected list of user experience options) are routed to or analyzed by the business rules manager 304 to determine and/or ensure compliance with one or more business rules 435, according to one embodiment. The business rules manager 304 applies the one or more business rules 435 to exclude or remove non-compliant user experience options from the selected user experience options 420, according to one embodiment. By excluding or removing non-compliant user experience options from the selected user experience options 420, the business rules manager enables the software system 411 to provide user experience options 310, in compliance with the business rules 435 without interfering with the software system 411 from dynamically and adaptively identifying, testing, and providing personalized user experiences that cause or result in current users performing one or more particular actions, according to one embodiment.

The business rules 435 are defined by a service provider of the software system, can be updated/modified by a system administrator, and/or can be defined at least partially based on the use of the software system, according to one embodiment. In other words, any one of a number of system administrators, clients, financial institutions, and/or other organizations can be provided access to the software system to update and/or modify one or more of the business rules 435, according to one embodiment. The business rules 435 include, but are not limited to, rules relating to financial offers, rules relating to questions provided, rules relating to paid-for content, rules relating to consistent messaging, rules relating to a user's device characteristics, and business relationships of the service provider of the software system (e.g., tax return preparation system), according to one embodiment. The business rules 435 include, but are not limited to, rules to maintain consistency in a tax return preparation sequence of content, rules about prohibited content based on the relationship of a user with the service provider of the software system, rules about mandatory content based on the relationship of a user with the service provider of the software system, rules about prohibited content based on the relationship between a service provider of the software system and other organizations (e.g., businesses, educational institutions, non-profit organizations, etc.), rules about content that should be shown to a user based on the relationship between a service provider of the software system and other organizations, and/or other rules that are related to the operation of the service provider that is hosting/providing the software system, according to one embodiment. For example, if a user experience option related to home ownership or marital status is provided to a user early on in a tax return preparation session, the business rules may prohibit the delivery of a redundant or similar content from being provided later in the tax return preparation session (even though the analytics model determines that the user is likely to prefer the content) to avoid causing frustration or other trust-reducing emotions in the user. If the user feels like the tax return preparation session or other user experience session is redundant or inconsistent, the user may receive the false impression that the software system does not or cannot understand the needs of the user. The user may also become frustrated and choose to quit the tax return preparation session (or other user experience session) and fail to convert to a paying user of the service provided by the software system.

The software system 411 includes memory 426 that has one or more sections 427 allocated for the operation or support of the software system 411, according to one embodiment. For example, the memory 426 and/or the one or more sections 427 are allocated to the storing and/or processing of: user characteristics data 416, user responses 417, the user experience analytics model 419, the user experience analytics model training module 421, and the like, according to one embodiment. The software system 411 also includes one or more processors 428 configured to execute and/or support the operations of the software system 411, according to one embodiment.

In one embodiment, the decision engine 302 is integrated into the software system 411 to support operation of the software system 411. In one alternative embodiment (as shown by dashed lines), the decision engine 302 is hosted in the service provider computing environment 410 and is allocated computing resources, e.g., memory 429 having sections 430, and one or more processors 431, that are different than some of the computing resources of the software system 411. In such an alternative embodiment, the decision engine 302 is hosted in the service provider computing environment 410 in order to provide support for the software system 411, in addition to providing support for a second service provider software system 432 and/or a third service provider software system 433, according to one embodiment. Although a second service provider software system 432 and a third service provider software system 433 are illustrated and described herein, the decision engine 302 can be configured to operationally support fewer or more software systems, according to various embodiments.

The user experience analytics model training module 421 initializes and/or updates the user experience analytics model 419 from a backend or off-line system, rather than as an integrated online process, according to one embodiment. For example, rather than sharing memory and processor resources with the software system 411, the user experience analytics model training module 421 is allocated dedicated memory and processor resources to facilitate secure and more timely processing of user characteristics of new and existing software system data, and of user experience options for training the user experience analytics model 419. In another embodiment, the user experience analytics model training module 421 is integrated into the software system 411, as illustrated, and shares one or more hardware resources with the decision engine 302, within the service provider computing environment 410, according to one embodiment.

Figure 5:
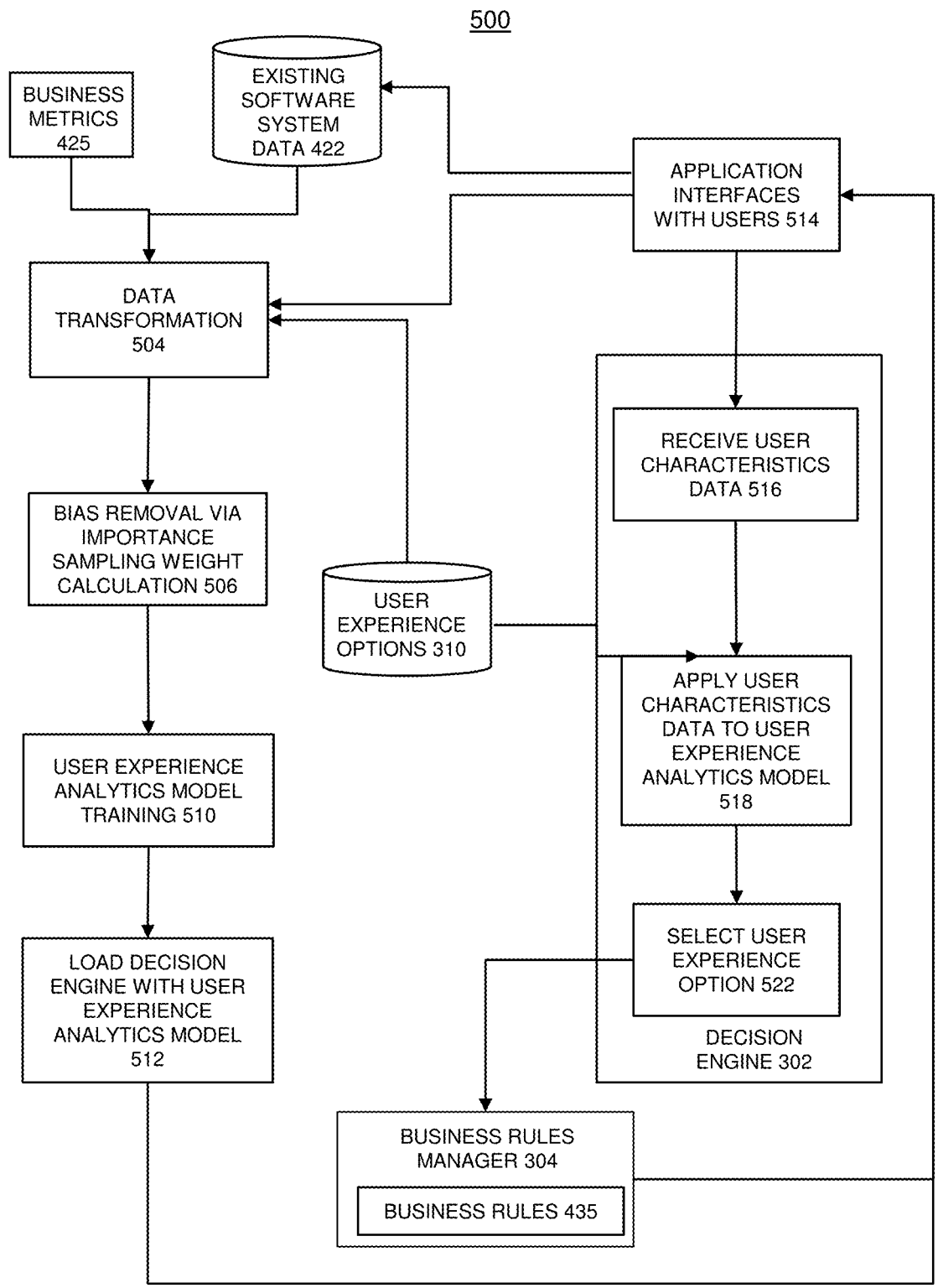
FIG. 5 is a flow diagram of an example of a process for training, updating, and applying a user experience analytics model and business rules, according to one embodiment.

FIG. 5 illustrates a process 500 for training (e.g., initializing and updating) the user experience analytics model 419, as described above, in compliance with one or more of the business rules 435, according to one embodiment.

Figure 6:
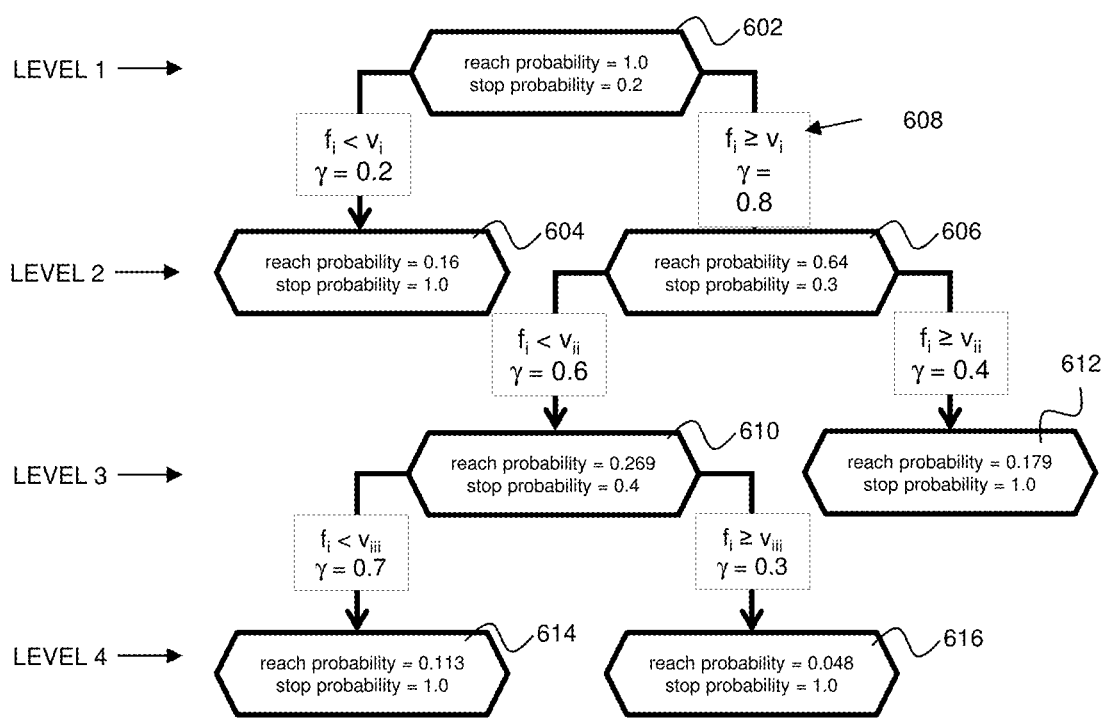
FIG. 6 is diagram of an example of a tree diagram for defining at least part of a user experience analytics model, according to one embodiment.

At operation 504, the process performs data transformation, to prepare existing software system data 422 and data representing business metrics 425 for processing, according to one embodiment. The process performs data transformation on the existing software system data 422 (inclusive of user characteristics data and user responses), on user experience options 310, and on business metrics 425. Data transformation includes, but is not limited to, formatting, rearranging, organizing, ranking, and/or prioritizing the data to enable it to be uniformly processed or analyzed by one or more equations and/or algorithms, according to one embodiment. Operation 504 proceeds to operation 506, according to one embodiment At operation 506, the process performs bias removal via importance sampling weight calculation, according to one embodiment. The process performs bias removal on the business metrics, such as conversions and revenue, as well as on user responses for the existing software system data 422 to account for particular user characteristics that were targeted, that are different, or that otherwise bias the user responses and/or the business metrics, according to one embodiment. Operation 506 proceeds to operation 510, according to one embodiment At operation 510, the process performs user experience analytics model training, according to one embodiment. The process uses the same algorithm to initialize and to update the user experience analytics model, according to one embodiment. The process trains the user experience analytics model by using techniques that include, but are not limited to, regression, logistic regression, decision trees, artificial neural networks, support vector machines, linear regression, nearest neighbor methods, distance based methods, Naive Bayes, linear discriminant analysis, k-nearest neighbor algorithm, and/or another mathematical, statistical, logical, or relational algorithms to determine correlations and/or other relationships between the user characteristics data and the performance of user experience options on segments of users, according to one embodiment. Operation 510 proceeds to operation 512, according to one embodiment In one embodiment, the process 500 performs user experience analytics model training by creating, validating, and/or modifying a decision tree. FIG. 6 illustrates an example of a decision tree 600 that can be used to determine at least part of the algorithm, logic, and/or function of the user experience analytics model that selects which user experience options to deliver to users based on user characteristics, to facilitate providing personalized user experiences in the software system 411. The decision tree 600 includes nodes 602, 604, 606, 610, 612, 614, and 616 (collectively, nodes 602-616) connected together through edges and edge logic. The edge logic defines the rules and parameters for traversing from a parent node to a child node in the decision tree 600, according to one embodiment. Each of the nodes 602-616 includes node properties, such as a reach probability, a stop probability, a user experience option, and a user segment.

The reach probability is the probability that a person coming into the stream of the decision tree will reach a particular node, according to one embodiment. Because all users are evaluated by the node 602, the reach probability of the node 602 is 1, indicating that there is a 100% chance that a user's characteristics will be evaluated by the node 602. Node 604 has a reach probability of 0.16 and node 606 has a reach probability of 0.64. Accordingly, of all the user traffic that is applied to the decision tree 600, node 604 will receive 16% of the user traffic and node 606 will receive 64% of the user traffic, on average, according to one embodiment.

In one embodiment, each node represents a segment of users to whom one of two user experience options (from one of two lists of user experience options) is provided. The users of a segment each receive one of two user experience options in accordance with the distribution frequency rate, according to one embodiment. The software system 411 dynamically adapts the distribution frequency rate, based on the evolving performance of user experience options among the users of each segment, according to one embodiment. So, while some users of a segment might initially receive a first user experience option at a distribution frequency rate of 0.7, with time users of the segment may receive the first user experience option at a distribution frequency rate than evolves toward 0.0 or that evolves towards 1.0, based on the responses/actions of the users of the segment that receive the first user experience. Accordingly, the software system validates the performance of one user experience option among the users of a segment, while testing the performance of another user experience option among the other users of the segment, to eventually determine which of two or more user experience options is most preferred by the users of a segment, according to one embodiment.

The stop probability is the probability that the performance of a particular node without children nodes (for a user segment) will be better than the performance of children nodes split from the particular node, according to one embodiment. In other words, the stop probability is the probability that the performance of a leaf node is greater than the performance of creating two children nodes from a leaf node to convert the leaf node to a parent node. If a stop probability is 1, then the probability of stopping the further evaluation of the data sample is 100%. If a stop probability is less than 1, then the stop probability represents a likelihood that the decision tree will apply the user experience option of the current node rather than evaluating a further path through the nodes of the decision tree 600, according to one embodiment. In one embodiment, if a data sample does not receive the user experience option of a parent node, then the data sample receives the user experience option of a descendent node.

At least two user experience options are assigned to each node (i.e., to each segment of users associated with a node) of the decision tree 600. In one embodiment, a user experience option is defined as omitting a user experience element (e.g., a button, a text box, a question, a webpage, etc.) from a user's personalized user experience. In one embodiment, a user experience option is defined as adding a user experience element or applying an analytics model, a sequence, or other user experience tool to a user's personalized user experience. In one embodiment, the user experience analytics model includes a different decision tree for each user experience option, so that each of the nodes in the decision tree represent a binary decision to apply or to not apply a user experience option to the user's personalized user experience. In one embodiment, the user experience analytics model includes a different decision tree for each user characteristic, and each of the nodes in the decision tree represent the application of two of a number of user experience options to users' personalized user experience (e.g., in accordance with distribution frequency rates for the user experience options and for the particular segment of users). In one embodiment, the user experience analytics model includes a decision tree having edge logic that evaluates different user characteristics and each node of the decision tree represent the application of one of a number of user experience options, and the node paths can include a variety user experience options (rather than a Boolean application of a single user experience option).

The user segment is a segment or portion of users who have at least one user characteristic in common. For example, a user set can be bifurcated into two user segments, in which a first user segment includes users who are younger than 30 years old and the second user segment includes users who are at least 30 years old, according to one embodiment.

Each of the nodes 602-616 belong to a level that is defined by 1 plus the number of connections between the node of interest and the root node. Because the root node is the top node in the decision tree 600, the root node for the decision tree 600 is the node 602. Accordingly, node 602 belongs to level 1, nodes 604 and 606 belong to level 2, nodes 610 and 612 belong to level 3, and nodes 614 and 616 belong to level 4 of the decision tree 600, according to one embodiment.

In one embodiment, the user experience option for a node is related to the level of the node in the decision tree 600. In one embodiment, all levels of one decision tree provide binary options for whether or not to apply a single user experience option to a user's personalized user experience. In one embodiment, each level of the decision tree is associated with a different user experience option, and each level of the decision tree provides binary options for whether or not to apply the user experience option associated with that level to a user's personalized user experience. In one embodiment, user experience options are allocated to nodes within the decision tree, based on the dominance or capacity of the user experience option to affect the actions of users, with more dominant user experience options being assigned to nodes that are closer to the root node.

In one embodiment, edge logic includes an edge frequency ($\gamma$) for which a single user characteristic ($f_i$) satisfies a threshold ($v_i$). The edge logic provides rules and the average frequency by which data samples traverse parent nodes to children nodes. The edge logic 608 indicates that the probability of the user characteristic ($f_i$) being greater than or equal to the threshold ($v_i$) is 0.8, and that the probability of the user characteristic ($f_i$) being less than the threshold ($v_i$) is 0.2, according to one embodiment. The reach probability of a child node is the product of the edge frequency ($\gamma$) multiplied with the stop probability subtracted from one. For example, the reach probability of node 606 is 0.64 which is equal to (1−stop probability of node 602)* ($\gamma$=0.8). In one embodiment, the thresholds for descendent nodes are different than all ancestor nodes because each descendent node already satisfies or inherits all of the characteristics of the descendent node's ancestor nodes.

Returning to the process 500 of FIG. 5, at operation 512, the process loads the decision engine with the user experience analytics model, according to one embodiment. Operation 512 proceeds to operation 514, according to one embodiment.

At operation 514, an application interfaces with users, according to one embodiment. The application interfaces with users by providing the users with questions to acquire user responses and/or to acquire user characteristics, according to one embodiment. The application interfaces with users by collecting clickstream data, IP address information, location of the user, operating system used by the user, user computing device identifiers, and other user characteristics data, according to one embodiment. The application and the decision engine save business metrics, user characteristics data, and/or user responses as existing software system data 422, according to one embodiment. The term "application" is used interchangeably with the term "software system", according to one embodiment. Operation 514 concurrently proceeds to operation 504 to update the user experience analytics model, and proceeds to operation 516 to apply the user experience analytics model to information received from the users, according to one embodiment.

At operation 516, the decision engine 302 receives user characteristics data, according to one embodiment. Operation 516 proceeds to operation 518, according to one embodiment.

At operation 518, the decision engine 302 applies the user characteristics data to a user experience analytics model, according to one embodiment. The decision engine 302 also applies the user experience options 310 to the user experience analytics model, according to one embodiment. The decision engine 302 applies the user characteristics data and the user experience options 310 to the user experience analytics model to determine the distribution frequency rates for which two or more user experience options are to be distributed to users having one or more of the user characteristics received during operation 516, according to one embodiment. Operation 518 proceeds to operation 522, according to one embodiment.

Although operation 518 is described in terms of determining distribution frequency rates for two or more user experience options, operation 518 operates similarly to operation 312 of FIG. 3 and determines distribution frequency rates for lists of user experience options, according to one embodiment. In one embodiment, determining distribution frequency rates includes identifying the most relevant ones of the user experience options 310, for each segment of users.

At operation 522, the decision engine 302 selects a user experience option, according to one embodiment. The decision engine 302 selects a user experience option based on the distribution frequency rates generated by the user experience analytics model in response to receipt of user characteristics data that describe a user. The decision engine 302 generates a pseudo-random number that is weighted according to the distribution frequency rates generated by the user experience analytics model, according to one embodiment. For example, if the user experience analytics model generates distribution frequency rates of 0.8 for filling a user experience display with a background color of red and 0.2 for filling a user experience display with a background color of blue, then the decision engine 302 generates a binary number which will indicate selecting a blue background color 8 out of 10 times and will indicate selecting a red background color 2 out of 10 times, on average, according to one embodiment. Because computing systems typically generate "random" numbers using algorithms and clocks, a "random" number generated by a computing system is referred to as a "pseudo-random" number.

Operation 522 functions similarly to operation 316 of FIG. 3 and selects one list of user experience options from two or more user experience options identified by the user experience analytics model, according to one embodiment.

The business rules manager 304 applies one or more of the business rules 435 to the selected list of user experience options or to the selected user experience option to prevent non-compliant user experience options (that are non-compliant with the business rules 435) from being used in personalized user experiences for current users of the software system, according to one embodiment.

Operation 522 proceeds to operation 514, according to one embodiment.

Figure 7:
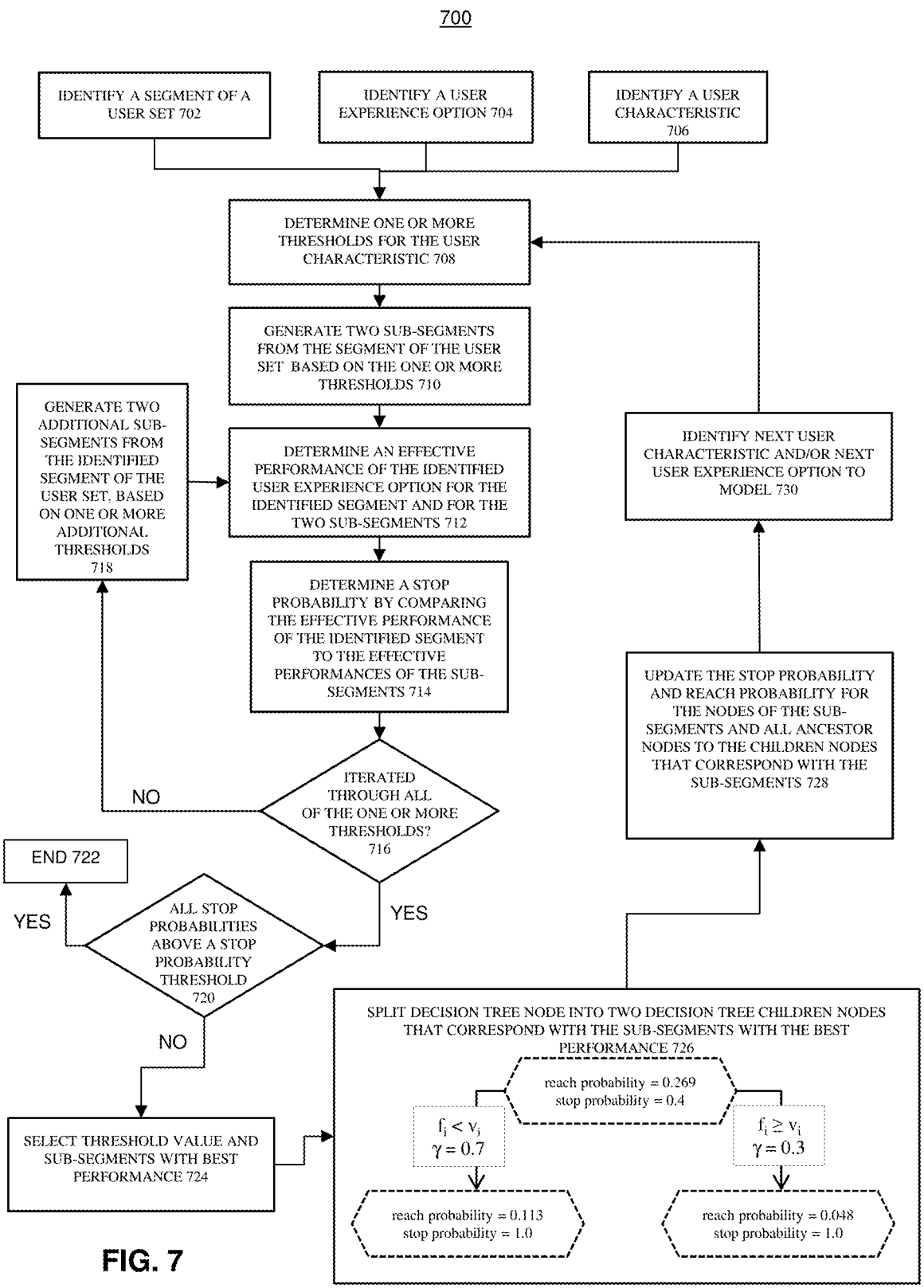
FIG. 7 is a flow diagram of an example of a process for defining a user experience analytics model, in accordance with one embodiment.

FIG. 7 illustrates an example of a process 700 that is employed or executed by the software system 411 of the production environment 400, to periodically update the user experience analytics model 419, according to one embodiment. By periodically updating the user experience analytics model and/or by defining/initializing the user experience analytics model 419, a software system (e.g., a tax return preparation system or other finance management system) can reap the benefits of deploying user experience options that are immediately effective on users (with a probabilistic certainty) while concurrently and adaptively testing user responses to other stimuli, e.g., other user experience options, to improve user satisfaction with the personalized user experience provided by the software system 411, according to one embodiment.

At operation 702 the process identifies a segment of a user set, according to one embodiment. The segment may be the entirety of the user set, may include recent users of the user set, may include users (i.e., prior users) who have interacted with a software system over a predetermined period of time (e.g., during a previous year), or may be any other subset of the user set, according to one embodiment. Operation 702 proceeds to operation 708, according to one embodiment.

At operation 704, the process identifies a user experience option, according to one embodiment. The user experience option identified by the process is used by the process to define nodes, node properties, and edge logic for traversing from parent nodes to children nodes, according to one embodiment. In one embodiment, identifying a user experience option includes identifying a plurality of user experience options, according to one embodiment. In one embodiment, operation 704 occurs prior to operation 702, after operation 702, or concurrently with operation 702, according to one embodiment. Operation 704 proceeds to operation 708, according to one embodiment.

At operation 706, the process identifies a user characteristic, according to one embodiment. As described above, user characteristics can include personal identification information, income information, tax-related information, clickstream information, geographic location of the user, an IP address or other computing or other user computing device identification information, family information about the user, and the like, according to various embodiments. The process performs operation 706 before, in between, after, or concurrently with operation 702 and/or operation 704, according to one embodiment. Operation 706 proceeds to operation 708, according to one embodiment.

At operation 708, the process determines one or more thresholds for the user characteristic, according to one embodiment. By determining the one or more thresholds, the process is able to define additional segments of users, to determine if the identified user experience option more effectively causes one segment of users to perform a particular action better than another segment of users, according to one embodiment. In other words, a threshold value such as 35 years of age, for a user characteristic of age, can be used to bifurcate a segment of users of all ages into to a sub-segment of users who are less than 35 years old and a sub-segment of users who are at least 35 years old, according to one embodiment. Operation 708 proceeds to operation 710, according to one embodiment.

At operation 710, the process generates two sub-segments from the segment of the user set, based on the one or more thresholds, according to one embodiment. The operation 710 proceeds to operation 712, according to one embodiment.

At operation 712, the process determines an effective performance of the identified user experience option for the identified segment and for the two sub-segments, according to one embodiment. The effective performance of the user experience option for the identified segment and/or for the two sub-segments is a probabilistic distribution that users (who are defined by the segments and/or sub-segments) will perform one or more predetermined actions, according to one embodiment. Examples of the determined actions include, but are not limited to, answering questions, remaining logged into a user session of the software system, filing a tax return, progressing through a sequence of topics or a sequence of questions, clicking a button, interacting with a particular user experience object or element, paying for a service, submitting credit card information, providing an email address, providing a telephone number, and the like, according to various embodiments. In one embodiment, the process uses Thompson Sampling on user responses to user experience options, at least partially based on user characteristics data, to determine a sample mean and a sample variance for the performance of user experience options on a segment of users, according to one embodiment. In one embodiment, the process uses Thompson Sampling blending or other mathematical techniques for calculating an average of multiple Thompson Samples to determine an effective performance of a user experience option on a segment or sub-segment, according to one embodiment. Operation 712 proceeds to operation 714, according to one embodiment.

At operation 714, the process determines a stop probability by comparing the effective performance of the identified segment to the effective performances of the two sub-segments of the identified segment, according to one embodiment. The stop probability is the probability that the performance of the identified segment is greater than the effective performance of the two sub-segments, according to one embodiment. In terms of nodes in a decision tree, the stop probability is the probability that the effective performance of a user experience option that is associated with a parent node is greater than an effective performance of user experience options that are associated with children nodes, according to one embodiment. A low stop probability indicates that the likelihood of gaining additional effective performance from the user experience analytics model will likely be gained from splitting an identified segment into two sub-segments, according to one embodiment. Operation 714 proceeds to operation 716, according to one embodiment.

At operation 716, the process determines if the process has iterated through all identified thresholds, according to one embodiment. For user characteristics having binary or Boolean outcomes such as yes or no, there may not be multiple thresholds to iterate through. However, if the user characteristics that are used to define part of the model have continuous values, e.g., users' ages, user income, and the like, then the process advantageously identifies and recurses through the multiple thresholds (e.g., through multiple age ranges or income ranges) to test the effective performance of a user experience option against variations of sub-segments, according to one embodiment. If the process completes iterating through all of the one or more thresholds, operation 716 proceeds to operation 720, according to one embodiment. If the process has not iterated through all of the one or more thresholds, operation 716 proceeds to operation 718, according to one embodiment.

At operation 718, the process generates two additional sub-segments from the identified segment of the user set, based on one or more additional thresholds, according to one embodiment. Operation 718 proceeds to operation 712, according to one embodiment.

At operation 720, the process determines if all stop probabilities are above a stop probability threshold, according to one embodiment. If all stop probabilities are above a stop probability threshold, e.g., 0.8, the operation 720 proceeds to operation 722 to end the process, according to one embodiment. If at least one of the stop probabilities is not above the stop probability threshold, operation 720 proceeds to operation 724.

At operation 724, the process selects a threshold value and the sub-segments with the best performance, according to one embodiment. The effective performance of segments and sub-segments is a probabilistic distribution having a sample mean and a sample variance. In one embodiment, the best performance includes a combination of a threshold and a user experience option that results in the highest sample mean. In one embodiment, the best performance includes a combination of a threshold and a user experience option that produces the lowest sample variance. In one embodiment, the best performance includes a combination of a threshold and a user experience option that produces the highest sample mean and/or the lowest sample variance while having a sample mean that is greater than a minimum threshold and/or while having a sample variance that is below a maximum sample variance threshold. Operation 724 proceeds to operation 726, according to one embodiment.

At operation 726, the process splits a decision tree node into two decision tree children nodes that correspond with the sub-segments with the best performance, according to one embodiment. When creating children nodes, the node properties (e.g., the reach probabilities, stop probabilities, user experience options, etc.) are defined for the children nodes and the node properties for the parent node of the split are also updated. Operation 726 proceeds to operation 728, according to one embodiment.

At operation 728, the process updates the stop probability and the reach probability for the nodes of the sub-segments and all ancestor nodes to the children nodes that correspond with the sub-segments, according to one embodiment. For example, because the sum of the reach probabilities for the nodes of the decision tree is 1, the reach probabilities of ancestor nodes are updated to reflect the addition of the children node reach probabilities, according to one embodiment. Operation 728 proceeds to operation 730, according to one embodiment.

At operation 730, the process identifies a next user characteristic and/or a next user experience option to model, according to one embodiment. Operation 730 proceeds to operation 708, according to one embodiment.

Figure 8:
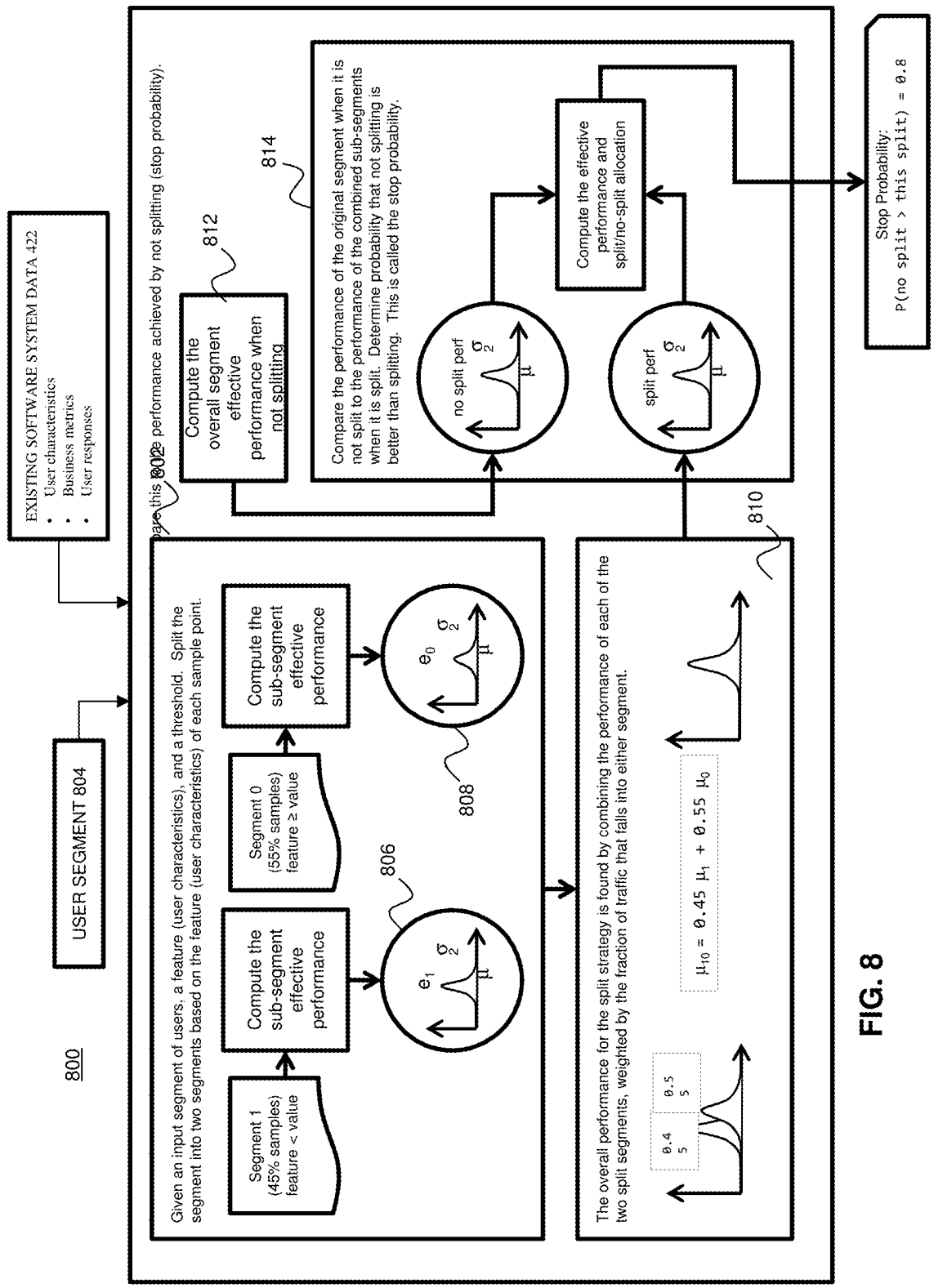
FIG. 8 is a flow diagram of an example of a process for determining a stop probability, in accordance with one embodiment.

FIG. 8 illustrates an example of a flow diagram for a process 800 for determining a stop probability, according to one embodiment. The process 800 is an example of one technique for determining a stop probability that can be performed during operation 714 of FIG. 7 of the process 700 for defining a user experience analytics model, according to one embodiment.

At block 802, the process splits a user segment 804 into two sub-segments, and determines the effective performance of each sub-segment based on existing software system data 422, according to one embodiment. The existing software system data includes, but is not limited to, user characteristics data, user responses, conversion rates of users to paying customers, revenue generated by the software system, and the like, according to one embodiment. The sub-segments are splits based on a value of the threshold and based on whether a user characteristic is less than the value or greater than or equal to the value of the threshold, according to one embodiment. The result of determining the effective performance of each sub-segment is a probabilistic distribution 806 and a probabilistic distribution 808 for the sub-segments, according to one embodiment. The probabilistic distributions 806 and 808 are not just an estimate of the performance of a user experience option on each sub-segment, instead, the probabilistic distributions 806 and 808 are estimations of the probability of the performance of a user experience option on the sub-segments. The effective performances result in probabilistic distributions because the effective performances are estimates of performance that include the uncertainty around how a user will respond to a user experience option integrated into the user's personalized user experience, according to one embodiment. The process proceeds from block 802 to block 810, according to one embodiment.

At block 810, the process determines/computes the combined effective performance of the effective performance of the two sub-segments, according to one embodiment. The process determines the combined effective performance by using addition or other mathematical operations to combine the performance of each sub-segment, with each sub-segment effective performance weighted by the edge frequency (γ) (fraction of parent node traffic from FIG. 4), to remove bias, in one embodiment. The process proceeds from block 810 to block 814, according to one embodiment.

At block 812, the process determines/computes the effective performance of the segment as though the sub-segments were not being split from the segment, according to one embodiment. In other words, the process computes the overall segment effective performance assuming the segment is not being split. The process proceeds from block 812 to block 814, according to one embodiment.

At block 814, the process compares the effective performance of the segment, when it is not split, to the combined effective performance of the sub-sections, to determine the stop probability, according to one embodiment. The stop probability is the probability that the effective performance of the un-split segment is greater or better than the effective performance of splitting the segment, according to one embodiment.

Figure 9:
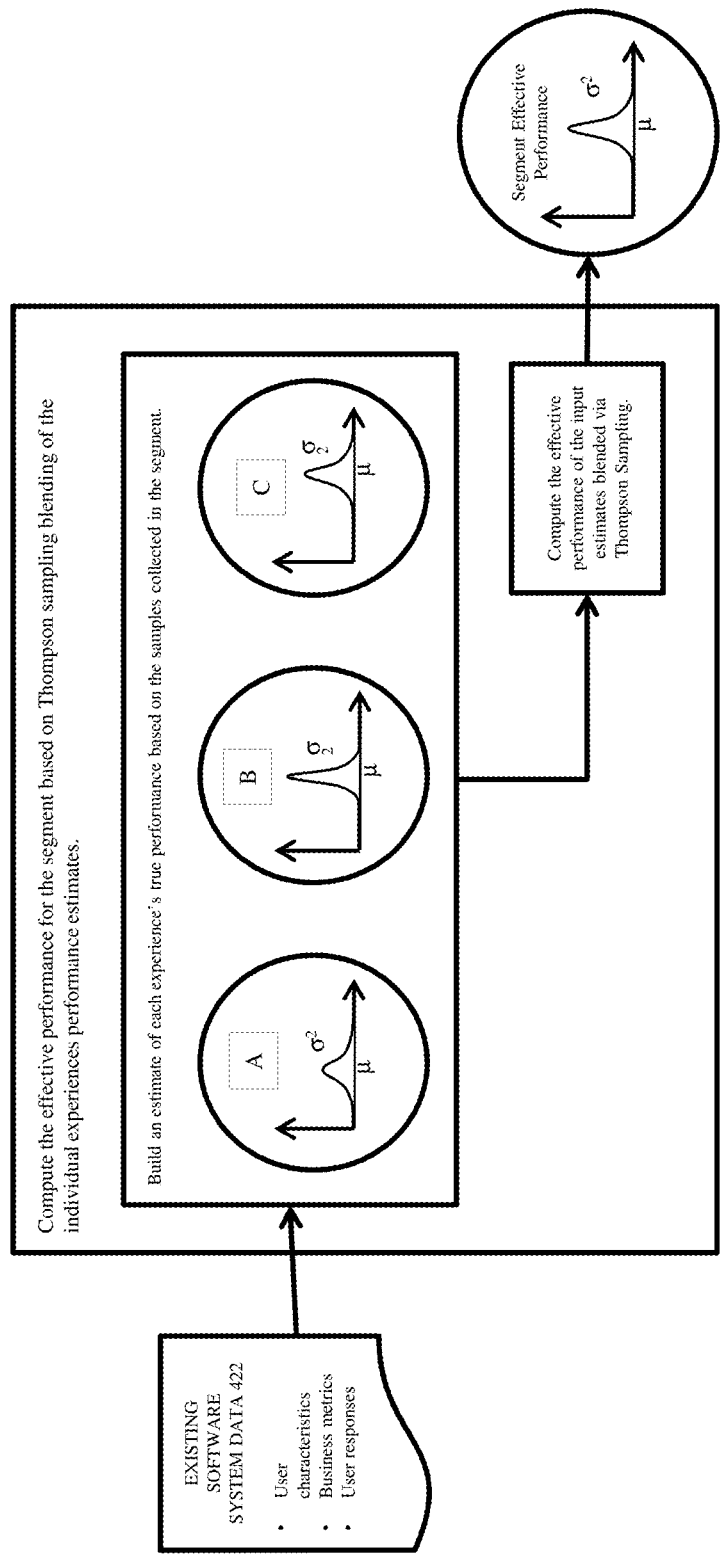
FIG. 9 is a flow diagram of an example of a process for computing the effective performance of a segment or sub-segment of users, in accordance with one embodiment.

FIG. 9 illustrates an example of a flow diagram of a process 900 for computing the effective performance of a segment or sub-segment of users, according to one embodiment. The process 900 is an example of one technique that can be used by operation 712 (shown in FIG. 7) for the process 700 for defining a user experience analytics model, according to one embodiment. The process 700 is an example of one technique that can be used in blocks 802 and/or 812 (shown in FIG. 8) for the process 800 for determining a stop probability, according to one embodiment.

The process 900 uses existing software system data 422 to compute the effective performance for a segment based on Thompson Sampling blending of the performance of individual user experience options and/or based on each individual user's experience/feedback with the software system (e.g., in response to receiving the user experience option in the user's personalized user experience), according to one embodiment.

Figure 10:
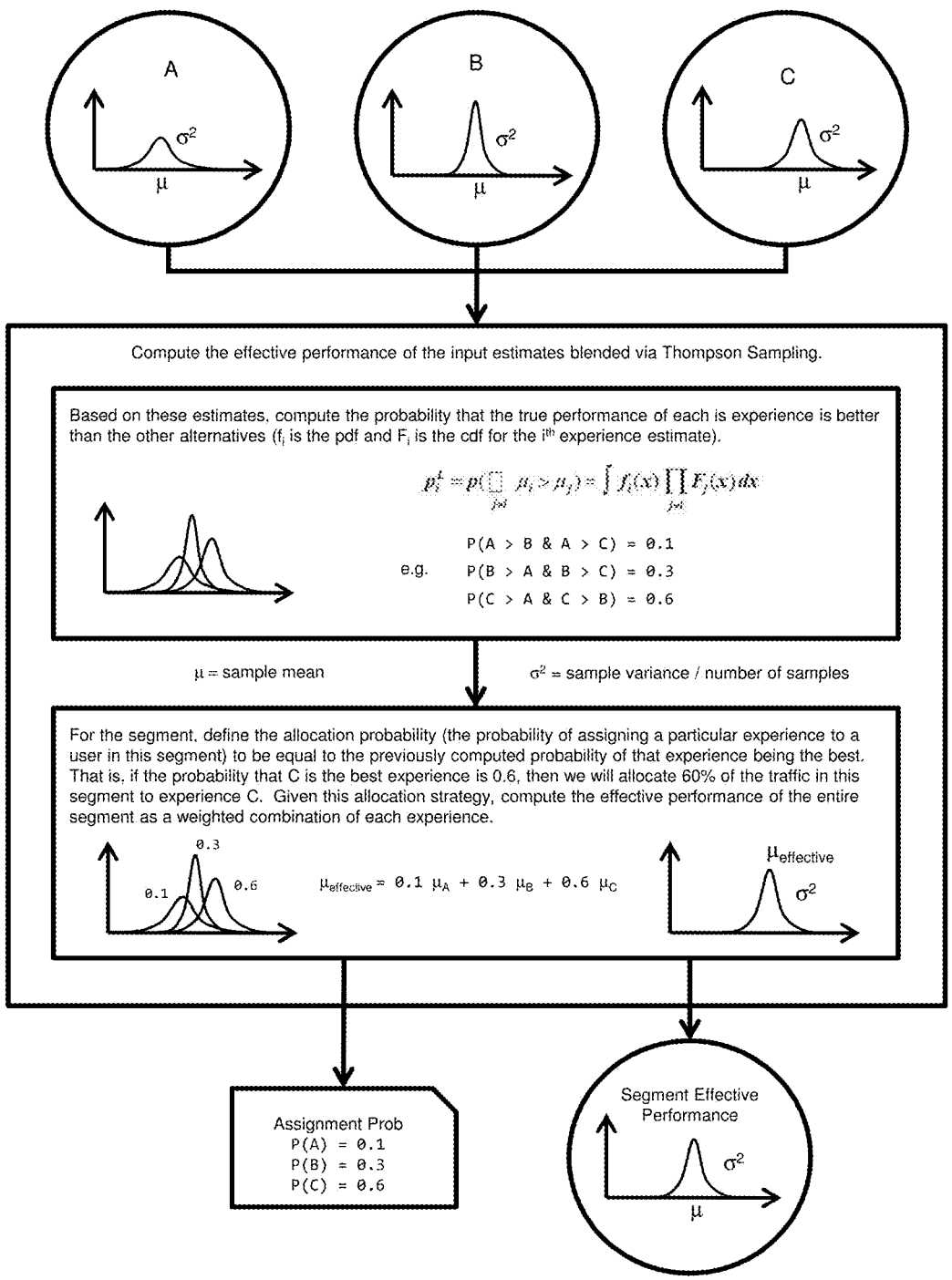
FIG. 10 is a flow diagram of an example of a process for computing the effective performance of input estimates blended by Thompson Sampling, according to one embodiment.

FIG. 10 illustrates an example flow diagram for a process 1000 for computing the effective performance of input estimates blended by Thompson Sampling, according to one embodiment. The process 1000 is an example of one technique that can be used in block 814 (show in FIG. 8) of the process 800 for determining a stop probability, according to one embodiment. The process 800 is an example of one technique that can be used during the process 700 for computing the effective performance of a segment or sub-segment, according to one embodiment.

The process 1000 uses the probability density function ("PDF") and the cumulative distribution function ("CDF") to determine the probability that the true performance of each user's experience or of each user experience option is better than alternative options, according to one embodiment. As illustrated in FIG. 10, the process 1000 computes the effective performance of an entire segment of users as a weighted combination of either each user's experience or of the distribution of a particular user experience option to the users of the segment of users, in one embodiment.

Figure 11A:
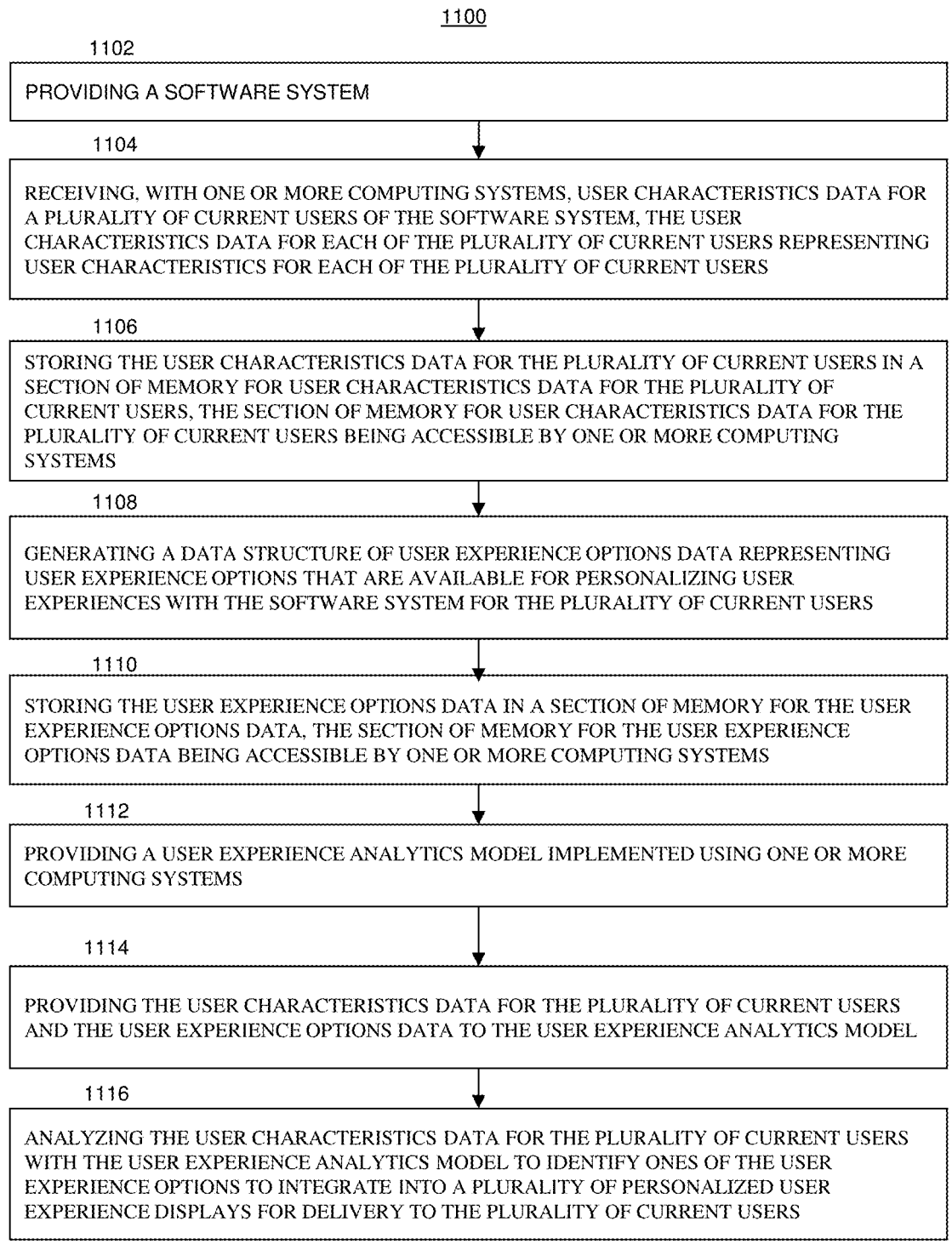
Figure 11B:
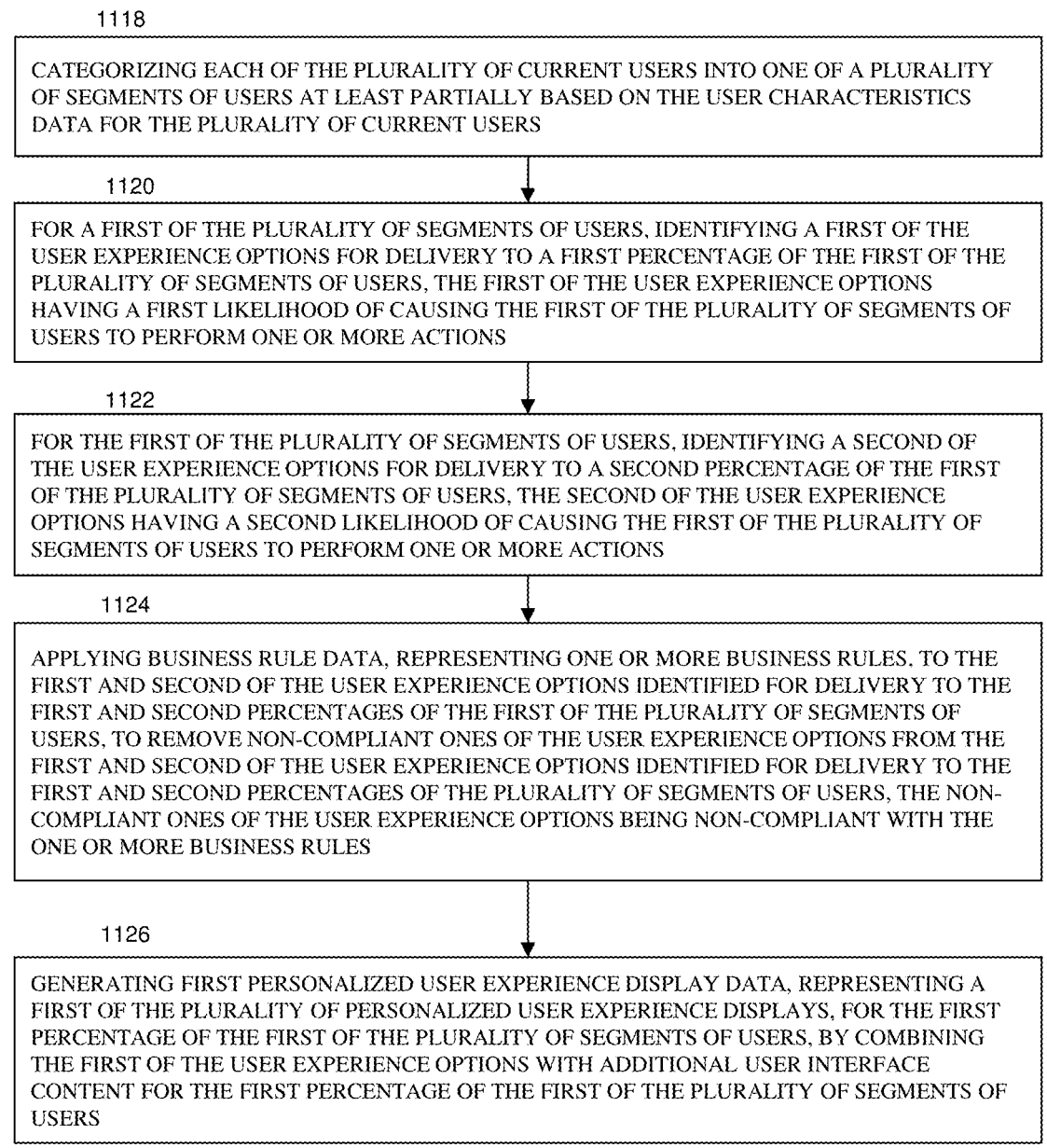

FIGS. 11A, 11B, and 11C illustrate an example flow diagram of a process 1100 for providing personalized user experiences in a software system, according to one embodiment.

At operation 1102, the process includes providing a software system, according to one embodiment. Operation 1102 proceeds to operation 1104, according to one embodiment.

At operation 1104, the process includes receiving, with one or more computing systems, user characteristics data for a plurality of current users of the software system, the user characteristics data for each of the plurality of current users representing user characteristics for each of the plurality of current users, according to one embodiment. Operation 1104 proceeds to operation 1106, according to one embodiment.

At operation 1106, the process includes storing the user characteristics data for the plurality of current users in a section of memory for user characteristics data for the plurality of current users, the section of memory for user characteristics data for the plurality of current users being accessible by one or more computing systems, according to one embodiment. Operation 1106 proceeds to operation 1108, according to one embodiment.

At operation 1108, the process includes generating a data structure of user experience options data representing user experience options that are available for personalizing user experiences with the software system for the plurality of current users, according to one embodiment. Operation 1108 proceeds to operation 1110, according to one embodiment.

At operation 1110, the process includes storing the user experience options data in a section of memory for the user experience options data, the section of memory for the user experience options data being accessible by one or more computing systems, according to one embodiment. Operation 1110 proceeds to operation 1112, according to one embodiment.

At operation 1112, the process includes providing a user experience analytics model implemented using one or more computing systems, according to one embodiment. Operation 1112 proceeds to operation 1114, according to one embodiment.

At operation 1114, the process includes providing the user characteristics data for the plurality of current users and the user experience options data to the user experience analytics model, according to one embodiment. Operation 1114 proceeds to operation 1116, according to one embodiment.

At operation 1116, the process includes analyzing the user characteristics data for the plurality of current users with the user experience analytics model to identify ones of the user experience options to integrate into a plurality of personalized user experience displays for delivery to the plurality of current users, according to one embodiment. Operation 1116 proceeds operation 1118, according to one embodiment.

At operation 1118, the process includes categorizing each of the plurality of current users into one of a plurality of segments of users at least partially based on the user characteristics data for the plurality of current users, according to one embodiment. Operation 1118 proceeds to operation 1120, according to one embodiment.

At operation 1120, the process includes, for a first of the plurality of segments of users, identifying a first of the user experience options for delivery to a first percentage of the first of the plurality of segments of users, the first of the user experience options having a first likelihood of causing the first of the plurality of segments of users to perform one or more actions, according to one embodiment. Operation 1120 proceeds to operation 1122, according to one embodiment.

At operation 1122, the process includes, for the first of the plurality of segments of users, identifying a second of the user experience options for delivery to a second percentage of the first of the plurality of segments of users, the second of the user experience options having a second likelihood of causing the first of the plurality of segments of users to perform one or more actions, according to one embodiment. Operation 1122 proceeds to operation 1124, according to one embodiment.

At operation 1124, the process includes applying business rule data, representing one or more business rules, to the first and second of the user experience options identified for delivery to the first and second percentages of the first of the plurality of segments of users, to remove non-compliant ones of the user experience options from the first and second of the user experience options identified for delivery to the first and second percentages of the plurality of segments of users, the non-compliant ones of the user experience options being non-compliant with the one or more business rules, according to one embodiment. Operation 1124 proceeds to operation 1126, according to one embodiment.

At operation 1126, the process includes generating first personalized user experience display data, representing a first of the plurality of personalized user experience displays, for the first percentage of the first of the plurality of segments of users, by combining the first of the user experience options with additional user interface content for the first percentage of the first of the plurality of segments of users, according to one embodiment. Operation 1126 proceeds to operation 1128, according to one embodiment.

At operation 1128, the process includes generating second personalized user experience display data, representing a second of the plurality of personalized user experience displays, for the second percentage of the first of the plurality of segments of users, by combining the second of the user experience options with the additional user interface content for the second percentage of the first of the plurality of segments of users, according to one embodiment. Operation 1128 proceeds to operation 1130, according to one embodiment.

At operation 1130, the process includes distributing the first personalized user experience display data to the first percentage of the first of the plurality of segments of users and the second personalized user experience display data to the second percentage of the first of the plurality of segments of users, to increase a likelihood that the first of the plurality of segments of users perform the one or more actions, and to concurrently validate an effectiveness of the first of the user experience options in causing the first percentage of the first of the plurality of segments of users to perform the one or more actions while testing an effectiveness of the second of the user experience options in causing the second percentage of the first of the plurality of segments of users to perform the one or more actions, according to one embodiment.

By providing personalized user experiences to users of a software system, and by providing the personalized user experiences in compliance with business rules, implementation of embodiments of the present disclosure allows for significant improvement to the fields of user experience, electronic tax return preparation, data analytics, data collection, and data processing, according to one embodiment. As one illustrative example, by filtering business rule non-compliant user experience options from delivery to current users of a software system, embodiments of the present disclosure allows for progressing a user through software system user flows and/or tax return preparation sessions with fewer processing cycles and less communications bandwidth because the user is more likely to be satisfied and less likely to prematurely terminate his/her user session prior to completing a particular activity (e.g., filing a tax return). This reduces processing cycles and communications bandwidth because a satisfied user does not redundantly use processing cycles and bandwidth to reenter his/her information into competing tax return preparation system and/or software system. In other words, improving customer satisfaction, by personalizing the user experiences, reduces global energy consumption by reducing redundant efforts and inefficiencies associated therewith. As a result, embodiments of the present disclosure allow for improved processor performance, more efficient use of memory access and data storage capabilities, reduced communication channel bandwidth utilization, and therefore faster communications connections.

In addition to improving overall computing performance, by providing personalized user experience options that are in compliance with one or more business rules, implementation of embodiments of the present disclosure represent a significant improvement to the field of automated user experiences and, in particular, efficient use of human and non-human resources. As one illustrative example, by increasing personal preferences for user experience options and by reducing presentation of non-preferred/less-effective user experience options, the user can more easily comprehend and interact with digital user experience displays and computing environments, reducing the overall time invested by the user to the tax return preparation or other software system-related tasks. Additionally, selectively presenting user experience options to users, based on their user characteristics and in compliance with business rules, improves and/or increases the likelihood that a potential customer will be converted into a paying customer because the potential customer receives confirmation that the software system appears to understand the particular user's needs and preferences, according to one embodiment. Consequently, using embodiments of the present disclosure, the user experience is less burdensome, less time consuming and allows the user to dedicate more of his or her time to other activities or endeavors, while having confidence that the tax return preparation system and/or software system is adequately addressing the needs of the user.

In accordance with an embodiment, a computer system implemented method provides personalized user experiences, in compliance with business rules of a service provider, to users of a software system. The process includes providing a software system, according to one embodiment. The process includes receiving, with one or more computing systems, user characteristics data for a plurality of current users of the software system, the user characteristics data for each of the plurality of current users representing user characteristics for each of the plurality of current users, according to one embodiment. The process includes storing the user characteristics data for the plurality of current users in a section of memory for user characteristics data for the plurality of current users, the section of memory for user characteristics data for the plurality of current users being accessible by one or more computing systems, according to one embodiment. The process includes generating a data structure of user experience options data representing user experience options that are available for personalizing user experiences with the software system for the plurality of current users, according to one embodiment. The process includes storing the user experience options data in a section of memory for the user experience options data, the section of memory for the user experience options data being accessible by one or more computing systems, according to one embodiment. The process includes providing a user experience analytics model implemented using one or more computing systems, according to one embodiment. The process includes providing the user characteristics data for the plurality of current users and the user experience options data to the user experience analytics model, according to one embodiment. The process includes analyzing the user characteristics data for the plurality of current users with the user experience analytics model to identify ones of the user experience options to integrate into a plurality of personalized user experience displays for delivery to the plurality of current users, according to one embodiment. Analyzing the user characteristics data for the plurality of current users includes categorizing each of the plurality of current users into one of a plurality of segments of users at least partially based on the user characteristics data for the plurality of current users, according to one embodiment. Analyzing the user characteristics data for the plurality of current users includes, for a first of the plurality of segments of users, identifying a first of the user experience options for delivery to a first percentage of the first of the plurality of segments of users, the first of the user experience options having a first likelihood of causing the first of the plurality of segments of users to perform one or more actions, according to one embodiment. Analyzing the user characteristics data for the plurality of current users includes, for the first of the plurality of segments of users, identifying a second of the user experience options for delivery to a second percentage of the first of the plurality of segments of users, the second of the user experience options having a second likelihood of causing the first of the plurality of segments of users to perform one or more actions, according to one embodiment. The process includes applying business rule data, representing one or more business rules, to the first and second of the user experience options identified for delivery to the first and second percentages of the first of the plurality of segments of users, to remove non-compliant ones of the user experience options from the first and second of the user experience options identified for delivery to the first and second percentages of the plurality of segments of users, the non-compliant ones of the user experience options being non-compliant with the one or more business rules, according to one embodiment. The process includes generating first personalized user experience display data, representing a first of the plurality of personalized user experience displays, for the first percentage of the first of the plurality of segments of users, by combining the first of the user experience options with additional user interface content for the first percentage of the first of the plurality of segments of users, according to one embodiment. The process includes generating second personalized user experience display data, representing a second of the plurality of personalized user experience displays, for the second percentage of the first of the plurality of segments of users, by combining the second of the user experience options with the additional user interface content for the second percentage of the first of the plurality of segments of users, according to one embodiment. The process includes distributing the first personalized user experience display data to the first percentage of the first of the plurality of segments of users and the second personalized user experience display data to the second percentage of the first of the plurality of segments of users, to increase a likelihood that the first of the plurality of segments of users perform the one or more actions, and to concurrently validate an effectiveness of the first of the user experience options in causing the first percentage of the first of the plurality of segments of users to perform the one or more actions while testing an effectiveness of the second of the user experience options in causing the second percentage of the first of the plurality of segments of users to perform the one or more actions, according to one embodiment.

In accordance with an embodiment, computer system implemented method provides personalized user experiences, in compliance with business rules of a service provider, to users of a software system. The process includes providing a software system, according to one embodiment. The process includes receiving, with one or more computing systems, user characteristics data for a plurality of current users, the user characteristics data for the plurality of current users representing user characteristics for the plurality of current users, according to one embodiment. The process includes storing the user characteristics data for the plurality of current users in a section of memory for user characteristics data for the plurality of current users that is accessible by one or more computing systems, according to one embodiment. The process includes generating a data structure of user experience options data representing user experience options that are available for personalizing user experiences with the software system for the plurality of current users, according to one embodiment. The process includes storing the user experience options data in a section of memory for the user experience options data that is accessible by one or more computing systems, according to one embodiment. The process includes providing a user experience analytics model implemented using one or more computing systems, according to one embodiment. The process includes providing the user characteristics data for the plurality of current users and the user experience options data to the user experience analytics model, according to one embodiment. The process includes identifying, with the user experience analytics model, a first group of the user experience options to provide to a first percentage of a segment of the plurality of current users, according to one embodiment. The process includes identifying, with the user experience analytics model, a second group of the user experience options to provide to a second percentage of the segment of the plurality of current users, according to one embodiment. The process includes applying business rule data, representing one or more business rules, to the first and second groups of the user experience options, to filter out non-compliant ones of the first and second groups of the user experience options from the first and second groups of the user experience options, the non-compliant ones of the first and second groups of the user experience options being in non-compliance with at least one of the one or more business rules, according to one embodiment. The process includes generating first personalized user experience display data, representing a first personalized user experience display, for the first percentage of the segment of the plurality of current users, by combining at least one of the first group of the user experience options with additional user interface content, according to one embodiment. The process includes generating second personalized user experience display data, representing a second personalized user experience display, for the second percentage of the segment of the plurality of current users, by combining at least one of the second group of the user experience options with the additional user interface content, according to one embodiment. The process includes distributing the first personalized user experience display data to the first percentage of the segment of the plurality of current users and the second personalized user experience display data to the second percentage of the segment of the plurality of current users, to improve a likelihood of the segment of the plurality of current users to perform one or more actions, and to concurrently validate an effectiveness of at least one of the first group of the user experience options in causing the first percentage of the segment of the plurality of current users to perform the one or more actions while testing an effectiveness of at least one of the second group of the user experience options in causing the second percentage of the segment of the plurality of current users to perform the one or more actions, according to one embodiment.

In accordance with an embodiment, a system provides personalized user experiences in compliance with one or more service provider business rules. The system includes a memory that stores user characteristics data of current users and of prior users of a software system, according to one embodiment. The system includes one or more processors communicatively coupled to the memory to perform operations on the user characteristics of the current users and of the prior users of the software system, according to one embodiment. The system includes a system engine that receives, with one or more processors, the user characteristics data of the current users and user responses data of the current users, the user characteristics data of the current users representing user characteristics of the users, the user responses data representing user responses of the current users, wherein the system engine stores the user characteristics data of the current users and the user responses data of the current users in the memory, according to one embodiment. The system includes a decision engine that receives, with the one or more processors, the user characteristics data of the current users from the memory and applies the user characteristics data of the current users to a user experience analytics model to identify a first percentage of a segment of the current users to which to provide first user experience data and to identify a second percentage of the segment of the current users to which to provide second user experience data, the first user experience data representing a first of a plurality of user experience options, the second user experience data representing a second of a plurality of user experience options, according to one embodiment. The system includes a business rules manager that applies business rule data to the first user experience data and to the second user experience data to determine whether the a first and second of the plurality of user experience options comply with one or more business rules represented by the business rule data, according to one embodiment. The business rules manager changes a non-compliant one of the first and second of the plurality of user experience options, to a compliant one of the first and second of the plurality of user experience options, if the first or second of the plurality of user experience options is non-compliant with one or more of the business rules, according to one embodiment. The system engine is configured to integrate the first user experience data into a first user experience display for delivery to the first percentage of the segment of the current users, and to integrate the second user experience data into a second user experience display for delivery to the second percentage of the segment of the current users, to increase a likelihood that the current users perform a particular task during user sessions with the software system, according to one embodiment.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various users under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding,"

"aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system comprising:
    one or more processors; and
    at least one memory coupled to the one or more processors and storing instructions that, when executed by the one or more processors, cause the system to perform operations comprising:
        retrieving a set of data indicating user characteristics for a plurality of system users;
        segmenting each system user of the plurality of system users into a number of user groups based on the user characteristics, wherein the number of user groups includes at least a first user group and a second user group;
        using an analytics model to determine a probability that a first set of user experience options will cause the first user group to continue using the system, wherein the first set of user experience options incorporates previous users' preferences for particular user experience content;
        using the analytics model to determine a probability that a second set of user experience options will cause the second user group to continue using the system, wherein the second set of user experience options is different from the first set of user experience options;
        identifying at least one non-compliant option among the first and the second set of user experience options, wherein the at least one non-compliant option violates at least one business rule;
        integrating the first set of user experience options into a first personalized user experience for the first user group, wherein the first personalized user experience excludes the at least one non-compliant option;
        integrating the second set of user experience options into a second personalized user experience for the second user group, wherein the second personalized user experience excludes the at least one non-compliant option;
        analyzing user feedback to the first and the second personalized user experience concurrently with determining a first and a second effectiveness of the first and the second personalized user experience, respectively;
        integrating the user feedback into the analytics model to dynamically train the analytics model to more accurately distribute user experience options that the plurality of system users are probabilistically likely to prefer;
        using the dynamically trained analytics model to dynamically adapt a rate at which the system distributes the first set of user experience options to the plurality of system users based at least in part on the first effectiveness; and
        using the dynamically trained analytics model to dynamically adapt a distribution frequency rate at which the system distributes the second set of user experience options to the plurality of system users based at least in part on the second effectiveness.

2. The system of claim 1, wherein the system is for at least one of tax return preparation, personal financial management, or business financial management.

3. The system of claim 1, wherein each non-compliant option of the at least one non-compliant option prohibits distribution of user experience options that are at least one of in conflict with a software version, in conflict with an agreement, incompatible with a hardware configuration, incompatible with a software configuration, inconsistent with information associated with a prior system interaction, or redundant.

4. The system of claim 1, the operations further comprising:
    updating the at least one non-compliant option based on one or more business rules received from at least one of a system administrator, an external organization, or a service provider.

5. The system of claim 1, wherein the first and the second set of user experience options include a first and a second subset of ranked options, respectively.

6. The system of claim 1, the operations further comprising:
    identifying a highest ranked non-compliant option among the first set of user experience options; and
    identifying a highest ranked non-compliant option among the second set of user experience options.

7. The system of claim 1, wherein the previous users' preferences for particular user experience content are represented by at least one of a hierarchical decision tree, a plurality of nodes, or a number of distribution frequency rates.

8. The system of claim 1, wherein the particular user experience content is associated with at least one of a user interface element, a web page, a user question, a system question, a button, a picture, a color, a position of a user interface element, a dialog box, a text box, a radio button, a drop-down menu, audio, video, a question type, a question format, a number of questions, a sequence of questions, an order of questions, a topic type, a number of topics, a sequence of topics, a price, a marketing offer, a customer support offer, a type of customer support, or one or more predictive models for prioritizing the presentation of personalized content to the plurality of system users.

9. The system of claim 1, wherein the user characteristics indicate at least one of a system characteristic, a time, a set of geographical information, a marketing segment, a user referrer, visits made to a particular website, an age, all or a portion of an address, a tax-related filing status, one or more forms of income or wages, a salary, a residence status, a retirement status, a retirement funding status, a student status, an occupation, information related to one or more claimed dependents, spousal information, one or more forms of government compensation or income, a taxable status, a previous itemized deduction, a user profile status, a medical history, a set of assets, one or more children, a name, a Social Security Number, a government identification, a date of birth, one or more expenses, one or more account deductions, one or more contributions, one or more financial losses, or one or more credits.

10. The system of claim 1, wherein continuing to use the system includes at least one of completing a sequence of questions, paying for a product, preparing a tax return, filing a tax return, entering personal information, entering credit card information, transitioning from a first page to a second page, logging in, or interacting with the system for an amount of time.

11. A method performed by one or more processors of a system, the method comprising:
retrieving a set of data indicating user characteristics for a plurality of system users;
segmenting each system user of the plurality of system users into a number of user groups based on the user characteristics, wherein the number of user groups includes at least a first user group and a second user group;
using an analytics model to determine a probability that a first set of user experience options will cause the first user group to continue using the system, wherein the first set of user experience options incorporates previous users' preferences for particular user experience content;
using the analytics model to determine a probability that a second set of user experience options will cause the second user group to continue using the system, wherein the second set of user experience options is different from the first set of user experience options;
identifying at least one non-compliant option among the first and the second set of user experience options, wherein the at least one non-compliant option violates at least one business rule;
integrating the first set of user experience options into a first personalized user experience for the first user group, wherein the first personalized user experience excludes the at least one non-compliant option;
integrating the second set of user experience options into a second personalized user experience for the second user group, wherein the second personalized user experience excludes the at least one non-compliant option;
analyzing user feedback to the first and the second personalized user experience concurrently with determining a first and a second effectiveness of the first and the second personalized user experience, respectively;
integrating the user feedback into the analytics model to dynamically train the analytics model to more accurately distribute user experience options that the plurality of system users are probabilistically likely to prefer;
using the dynamically trained analytics model to dynamically adapt a rate at which the system distributes the first set of user experience options to the plurality of system users based at least in part on the first effectiveness and
using the dynamically trained analytics model to dynamically adapt a distribution frequency rate at which the system distributes the second set of user experience options to the plurality of system users based at least in part on the second effectiveness.

12. The method of claim 11, wherein the system is for at least one of tax return preparation, personal financial management, or business financial management.

13. The method of claim 11, wherein each non-compliant option of the at least one non-compliant option prohibits distribution of user experience options that are at least one of in conflict with a software version, in conflict with an agreement, incompatible with a hardware configuration, incompatible with a software configuration, inconsistent with information associated with a prior system interaction, or redundant.

14. The method of claim 11, further comprising:
updating the at least one non-compliant option based on one or more business rules received from at least one of a system administrator, an external organization, or a service provider.

15. The method of claim 11, wherein the first and the second set of user experience options include a first and a second subset of ranked options, respectively.

16. The method of claim 11, wherein continuing to use the system includes at least one of completing a sequence of questions, paying for a product, preparing a tax return, filing a tax return, entering personal information, entering credit card information, transitioning from a first page to a second page, logging in, or interacting with the system for an amount of time.

* * * * *